US011458436B2

(12) United States Patent
Temple et al.

(10) Patent No.: US 11,458,436 B2
(45) Date of Patent: Oct. 4, 2022

(54) METHODS FOR ABSORBING A TARGETED COMPOUND FROM A GAS STREAM FOR SUBSEQUENT PROCESSING OR USE

(71) Applicants: Stephen R. Temple, Santa Cruz, CA (US); Bjorn Temple, Santa Cruz, CA (US)

(72) Inventors: Stephen R. Temple, Santa Cruz, CA (US); Bjorn Temple, Santa Cruz, CA (US)

(*) Notice: Subject to any disclaimer, the term of this patent is extended or adjusted under 35 U.S.C. 154(b) by 0 days.

(21) Appl. No.: 17/566,961

(22) Filed: Dec. 31, 2021

(65) Prior Publication Data

US 2022/0118404 A1 Apr. 21, 2022

Related U.S. Application Data

(63) Continuation-in-part of application No. 17/004,623, filed on Aug. 27, 2020.

(60) Provisional application No. 62/892,828, filed on Aug. 28, 2019.

(51) Int. Cl.
*B01D 53/58* (2006.01)
*B01D 53/75* (2006.01)
*B01D 53/78* (2006.01)

(52) U.S. Cl.
CPC .............. *B01D 53/78* (2013.01); *B01D 53/58* (2013.01); *B01D 53/75* (2013.01); *B01D 2257/406* (2013.01); *B01D 2258/0266* (2013.01)

(58) Field of Classification Search
CPC ......... C11B 13/00; C11B 3/00; B09B 3/0083; B09B 2220/04; B01D 19/00; B01D 53/00; B01D 53/14; B01D 53/58; B01D 2221/06; B01D 2257/406; B01D 2258/0275; B01D 53/75; B01D 53/78; B01D 2258/0266; C02F 1/20; C02F 1/40; C02F 1/586; C02F 11/004; C02F 2101/16; C02F 2103/22; C05C 11/00
See application file for complete search history.

(56) References Cited

U.S. PATENT DOCUMENTS

| | | | | |
|---|---|---|---|---|
| 3,320,906 A | * | 5/1967 | Domahidy | F23J 15/00 110/190 |
| 4,996,038 A | * | 2/1991 | McAlister | C01B 17/7655 422/240 |
| 10,604,432 B2 | * | 3/2020 | Bassani | B01D 9/00 |

* cited by examiner

*Primary Examiner* — Timothy C Vanoy
(74) *Attorney, Agent, or Firm* — Owens Law Firm, PC

(57) ABSTRACT

The present invention describes methods for absorbing a targeted chemical compound from a gas stream into a scrubbing solution for various uses and with various benefits. Methods are described to produce a gas stream that can be further processed with operational benefits, such as through condensing and wastewater treatment with a lower load on the wastewater treatment system. Methods are described for adsorbing the targeted compound with reduced condensation of water from the gas stream. Methods are described for producing a liquid stream comprising an absorbed form of the targeted compound for use as a saleable product, such as adsorbing ammonia for the production of a fertilizer, wherein the concentration of the absorbed form may be increased through reduced condensation from the gas stream. Methods are described for producing a lower volume liquid waste stream from the absorption process through the use of reduced condensation of the gas stream.

20 Claims, 4 Drawing Sheets

US 11,458,436 B2

METHODS FOR ABSORBING A TARGETED COMPOUND FROM A GAS STREAM FOR SUBSEQUENT PROCESSING OR USE

CROSS REFERENCE TO RELATED APPLICATIONS

This application is a continuation-in-part of prior U.S. application Ser. No. 17/004,623 filed on Aug. 27, 2020, which claims the benefit of U.S. Provisional Application No. 62/892,828, filed Aug. 28, 2019, both of which are incorporated by reference herein in their entireties.

BACKGROUND OF THE INVENTION

Field of the Invention

The invention and its various embodiments relate to methods for removing a targeted component or compound from a gas stream comprising water that can be used to treat the gas stream prior to its subsequent processing by another process or to produce a liquid stream comprising an absorbed form of the targeted compound that can in turn be used directly, or after further processing, as a product, such as a commercial or saleable product, or to reduce wastewater discharge. In particular, in some embodiments, the methods can be used to process a hot multi-phase gas stream comprising ammonia, water, water vapor, fats, oils and greases, such as a waste gas stream from an animal byproduct processing facility, by removing the ammonia from the gas stream as a pretreatment process upstream of a wastewater treatment system or to reduce condensation of the water in the gas stream and produce a liquid stream comprising an absorbed form of the ammonia that can be used directly, or after further processing, as a fertilizer or to produce a fertilizer, including, for example, a fertilizer for use in organic agriculture, or reduce wastewater discharge.

Description of Related Art

Techniques for removing certain components from gas streams are known. In some cases, the treatment of such gas streams can be complicated and energy intensive. Moreover, disposal of the resulting liquid and gas streams can be problematic and expensive.

Accordingly, there is a need for methods for removing certain components from certain gas streams, in particular, industrial gas streams and waste gas streams that contain water, such as water vapor, and, in some cases, multiple other chemical compounds. In some cases, there is a need for methods for separating these compounds from the gas stream while reducing condensation of the water in the gas stream. In some cases, there is a need for methods for removing certain components from a certain gas stream to provide a gas stream for subsequent processing, such as treatment of a liquid stream generated from the gas stream, such as a condensed gas stream, by a wastewater treatment system, in which such subsequent processing benefits from the removal of such components and by any reduction in condensation of any water or water vapor in the gas stream. In some cases, there is a need for methods for removing certain compounds from the gas stream that can be used to generate, while reducing or minimizing condensation of water in the gas stream, a liquid stream containing an absorbed form of the removed compound that can in turn be used directly, or after further processing, as a product, such as a commercial or saleable product. In some cases, there is a need to reduce wastewater emissions that would otherwise result from processing of certain gas streams.

Further, organic farming, which produces certified organic products, can only use natural or non-synthetic fertilizers or soil amendments. Accordingly, particular attention is required to produce such natural or non-synthetic fertilizers or soil amendments to ensure compliance with U.S. federal government regulations for organic farming and certified organic products, resulting in higher production costs for such fertilizers and soil amendments. Therefore, there is a need for methods that can produce fertilizers and soil amendments that can be used in organic farming that are less expensive.

BRIEF SUMMARY OF THE INVENTION

In general, the present invention in some embodiments is directed to a method or process for removing a targeted component or compound from a gas stream into a liquid scrubbing solution as a pretreatment step to provide a gas stream for further processing; to produce a liquid stream comprising an absorbed form of the targeted compound that can be used directly, or after further processing, as a product, such as a commercial or saleable product; or to reduce wastewater discharge. In some embodiments, the gas stream comprises water and the method of the present invention provides a process that reduces or eliminates the condensation of the water during removal of the targeted compound, which may concentrate the absorbed form of the targeted compound in the liquid stream or provide a lower volume liquid stream for disposal in those embodiments in which the liquid stream or absorbed form of the targeted compound is not intended as a product and is intended for disposal.

In one embodiment, the present invention provides a method for absorbing a targeted compound in a gas stream, comprising feeding a gas stream to a gas/liquid contactor, wherein the gas stream comprises a chemical compound; passing a liquid stream through the gas/liquid contactor thereby contacting the gas stream and the liquid stream; absorbing the chemical compound from the gas stream into the liquid stream, thereby providing a gas stream exiting the gas/liquid contactor with a lower concentration of an absorbed form of the chemical compound, wherein the exit gas stream is provided for further processing, for example, by a wastewater treatment facility that treats a liquid stream generated from the exit gas stream, such as by condensing the exit gas stream. In such an embodiment, the removal of the chemical compound reduces the amount of further processing or improves the efficiency or operation of such further processing, such as processing of the liquid stream generated from the exit gas stream or a condensed gas stream, by a wastewater treatment facility or process. In some embodiments, removal of certain compounds from the gas stream that is then condensed and fed to a wastewater treatment system, reduces the loading of those compounds on the wastewater treatment system. By reducing the load on a wastewater treatment system, the upstream or separate process from which the gas stream to be treated is generated, may operate with an expanded or increased capacity relative to the wastewater treatment system, since the wastewater treatment system would be operating at a lower load or below capacity. In other words, the present invention would reduce or eliminate the wastewater treatment system as a limiting operation in the overall process.

In another embodiment, the present invention provides a method for absorbing a targeted compound in a gas stream, comprising feeding a gas stream to a gas/liquid contactor, wherein the gas stream comprises a gas phase chemical compound; passing a liquid stream through the gas/liquid contactor thereby contacting the gas stream and the liquid stream; absorbing the chemical compound from the gas stream into the liquid stream, thereby converting the chemical compound into an absorbed form of the chemical compound; separating at least a portion of the liquid stream comprising the absorbed form of the chemical compound; wherein the absorbed form of the chemical compound comprises a usable or saleable product. It should be appreciated that in some embodiments, the process is operated to avoid or minimize condensation of any water vapor in the gas stream. Accordingly, the absorbed form of the chemical compound in liquid stream would be more concentrated since any dilution due to condensation would have been reduced or eliminated. In addition, in those embodiments in which the liquid stream comprising the absorbed form of the chemical compound is not intended as a product and, as such, must be disposed of, that liquid stream would have a lower volume.

The present invention also provides several variations to the methods of the present invention. For example, in one embodiment of the present invention, the gas stream comprises water, such as water vapor, and the methods further comprise conducting the absorbing in the gas/liquid contactor at a temperature that reduces, minimizes, or eliminates condensation of the water vapor in the gas/liquid contactor, such as at a higher temperature than what would otherwise be the normal operating temperature of the gas stream, for example, by heating the gas stream or liquid scrubbing solution.

In another embodiment, the methods comprise adding a second gas phase chemical compound to the gas stream prior to the feeding of gas stream to the gas/liquid contactor; absorbing the second gas phase chemical compound from the gas stream into the liquid stream; reacting the gas phase chemical compound in the liquid stream with the absorbed form of the chemical compound to produce an alternate form of the absorbed chemical compound; and dissociating the alternate form of the absorbed chemical compound to produce the absorbed form of the chemical compound.

The present invention and its various embodiments provide several benefits. The present invention provides the ability to generate a gas stream for subsequent treatment in which such subsequent treatment is improved by virtue of the present invention and the removal of targeted compounds in the gas phase. For example, the present invention may provide a pretreatment step for subsequent processing, such as processing of a liquid stream generated from a gas stream, such as a condensed gas stream, ultimately by a wastewater treatment facility. However, it should be appreciated that the present invention may provide a pretreatment step for other types of subsequent processing, such as for an air scrubber for use in connection with an animal waste drying process.

The present invention also provides the ability to recover particular or targeted chemical compounds for subsequent use. Specifically, the chemical compounds are absorbed from the gas stream into a liquid scrubbing solution from which a liquid stream comprising the absorbed form of the targeted compound is generated or provided. This liquid stream with the absorbed form of the chemical compound may be used directly as a product. In particular, the present invention provides the ability to recover ammonia from waste gas streams, which may have significant value if separated from the waste gas stream. In some cases, the separated ammonia can be processed into fertilizer, including fertilizer or soil amendments suitable for organic farming and the production of certified organic products.

In those embodiments in which the present invention reduces or eliminates condensation of water vapor in the gas stream during absorption, the resulting liquid stream may have a higher concentration of the absorbed form of the targeted compound. This benefit may be realized, in particular, when using gas streams having heat content. Such gas streams may include gas streams from any industrial process, such as rendering and other animal and human waste processing systems in which heat is added during the generation of these gas streams, thus providing a gas stream having a given heat content. Alternatively, in those embodiments in which the liquid stream having the absorbed form of the targeted compound is not intended for use as a product, reducing or eliminating condensation of the water in the gas stream will produce a lower volume liquid stream for disposal.

In yet another general embodiment, the present invention provides a process for the successive removal of the targeted chemical compound as well as other various components by the various, sequential process operations from the initial gas stream being treated or additional gas streams added to the process. Accordingly, in these embodiments, this effect ultimately reduces the burden on any subsequently used oxidizer. For example, focusing on ammonia as the targeted chemical compound in the gas stream, the removal of ammonia through the process results in the removal of a significant portion, if not all, of the ammonia. Therefore, the gas stream will provide a relatively lower load of ammonia on any subsequently used oxidizer. Since ammonia is a precursor to formation of $NO_x$ compounds in an oxidizer, the reduction in ammonia will provide a much lower formation rate and amount of $NO_x$ compounds in the oxidizer and the gas discharge from the oxidizer. Similarly, the process provides the ability to reduce the $SO_x$ loading to the oxidizer, thereby reducing the $SO_x$ emissions from the oxidizer. Further, it should be appreciated that the process provides the ability to reduce the particulate matter (PM), including PM 2.5, in the gas stream from the oxidizer and hydrogen sulfide. Since PM is formed post combustion from the combination of ammonia and hydrogen sulfide to form ammonia sulfate, the reduction of these reactants by the various process operations in the overall process will result in lower formation of PM. Reducing the concentration of ammonia as described above and reducing the concentration of hydrogen sulfide will reduce the formation of PM and the amount of PM discharged. In other more specific embodiments, the process may utilize various process modifications, such as adding heat to the process or adding air to the gas stream being treated.

In some embodiments, the gas stream may be a waste gas stream generated in an animal waste process that processes waste animal tissue or animal parts, such as rendering. For example, the waste gas stream may be one or more gas streams generated by cooking, drying, concentrating, hydrolyzing (e.g., hydrolyzing of chicken feathers or pig hair), or blood drying processes. The present invention provides the ability to remove a targeted chemical compound, such as ammonia, from these gas streams prior to any condensing operation, thereby reducing or eliminating the collecting or condensation of ammonia in the water that is otherwise condensed. By reducing or eliminating the ammonia content in such condensate, a reduction in the burden on any subsequent wastewater treatment system is realized. It should be appreciated that many processes typically condense the water vapor in a given waste gas stream prior to any subsequent treatment of the waste gas stream, thereby removing various chemical compounds from the gas stream with the condensate. Such processes place a significant burden on any subsequent wastewater treatment system, even in those processes where the concentration of the targeted chemical compound, such as ammonia, is present in the condensate in a relatively low amount. The present invention reduces or eliminates this issue. Even treating a gas stream with a significant amount of water vapor and relatively lower amount of a given targeted chemical compound, such as ammonia, with the methods of the present invention, allows for the removal of that targeted chemical compound prior to condensation, thereby reducing or eliminating the burden otherwise placed on the wastewater treatment system due to the presence of the targeted chemical compound in the condensate.

In some embodiments, the methods of the present invention are directed to removing a chemical compound from a waste gas stream to prepare the waste gas stream for further processing, comprising feeding a waste gas stream to a gas/liquid contactor, wherein the waste gas stream comprises a targeted chemical compound to be removed from the waste gas stream; and absorbing the targeted chemical compound from the waste gas stream into a scrubbing solution in the gas/liquid contactor, thereby producing an exit gas stream from the gas/liquid contactor; wherein the absorbing is performed prior to any condensing of the waste gas stream. In another embodiment, the methods of the present invention are directed to a method for removing a chemical compound from a waste gas stream to prepare the waste gas stream for further processing, comprising feeding a waste gas stream to a gas/liquid contactor, wherein the waste gas stream comprises a targeted chemical compound to be removed from the waste gas stream; recycling a scrubbing solution through the gas/liquid contactor; heating the scrubbing solution during said recycling to provide heat to the scrubbing solution to reduce condensation of water content of the waste gas stream compared to not heating the scrubbing solution; and absorbing the targeted chemical compound from the waste gas stream into the scrubbing solution in the gas/liquid contactor, thereby producing an exit gas stream from the gas/liquid contactor; wherein the absorbing is performed prior to any condensing of the waste gas stream. In such embodiments, heating the scrubbing solution allows for further control over the condensation of any water vapor in the waste gas stream, for example, in those processes in which the waste gas stream may carry a significant amount of water vapor that may otherwise condense in the gas/liquid contactor, thereby diluting the concentration of the targeted chemical compound in the scrubbing solution and product stream. In this case, heating the scrubbing solutions provides for the ability to minimize or eliminate the condensation of such water vapor in the waste gas stream. In yet another embodiment, the methods of the present invention are directed to a method for removing a chemical compound from a waste gas stream from a process to produce a product stream, comprising adding air to a waste gas stream to produce a diluted waste gas stream, wherein the waste gas stream comprises a targeted chemical compound to be removed from the waste gas stream; feeding the diluted waste gas stream to a gas/liquid contactor; and absorbing the targeted chemical compound from the waste gas stream into a scrubbing solution in the gas/liquid contactor, thereby producing an exit gas stream from the gas/liquid contactor; wherein the absorbing is performed prior to any condensing of the waste gas stream. In such embodiments, the addition of air increases the amount of water vapor that may be carried by the waste gas stream, such that water from the scrubbing solution may be evaporated or flashed into the waste gas stream in the gas/liquid contactor. Such may be particularly useful when the waste gas stream is already saturated. The evaporation of water from the scrubbing solutions also provides the ability to concentrate the absorbed targeted chemical compound in the scrubbing solution and resulting product stream.

DETAILED DESCRIPTION OF THE INVENTION

Figure 1:
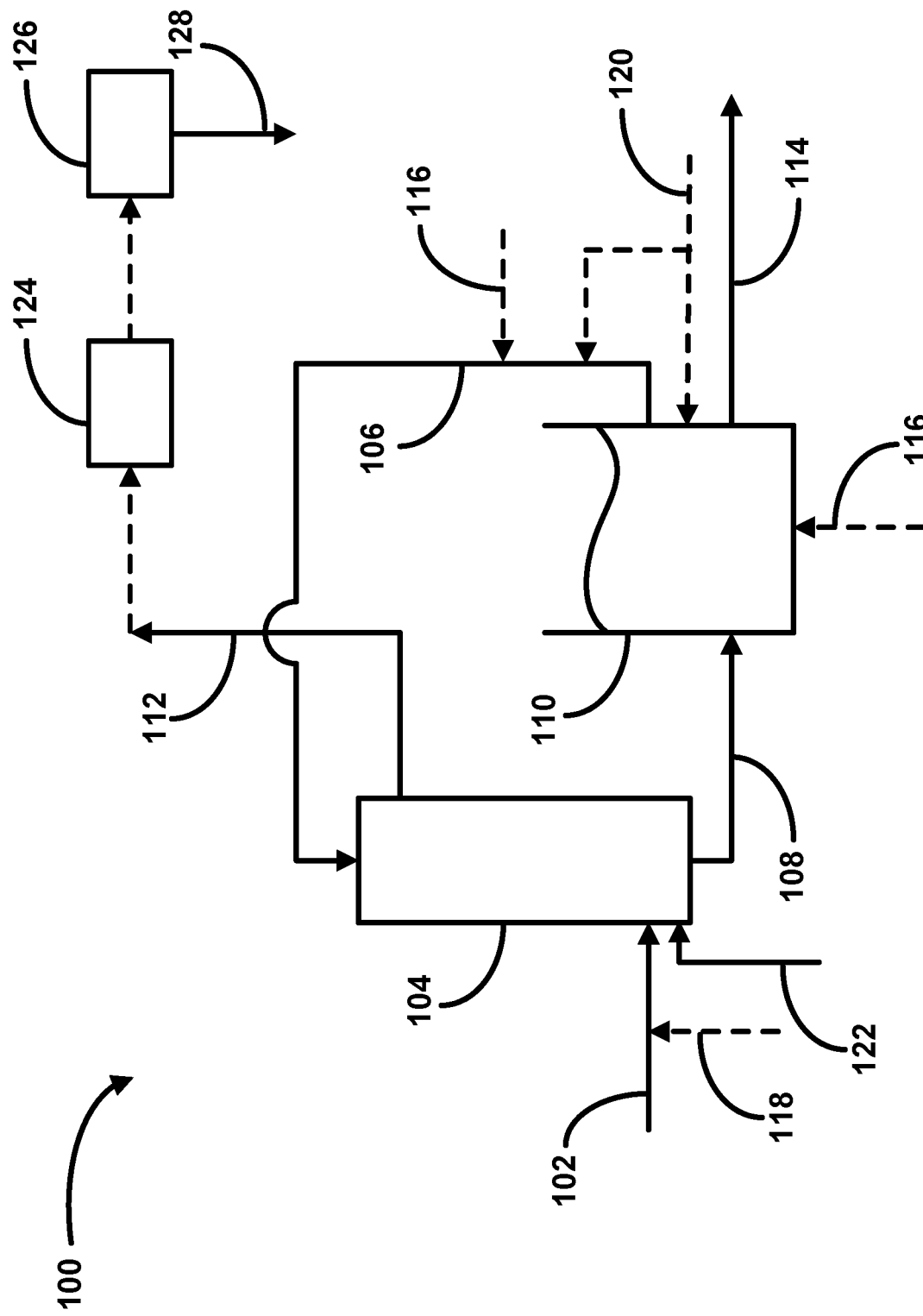
FIG. 1 is a process flow diagram illustrating a process for removing a targeted chemical compound from a gas stream to produce a gas stream for subsequent treatment or to produce a liquid stream comprising an absorbed form of the targeted compound for use as a saleable product (either directly or after further processing) according to one embodiment of the present invention.

The present invention is more fully described below with reference to the accompanying drawings. While the invention will be described in conjunction with particular embodiments, it should be understood that the invention can be applied to a wide variety of applications, and it is intended to cover alternatives, modifications, and equivalents within the spirit and scope of the invention. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

In general, the present invention is directed to methods or processes for treating a gas stream that may be a multi-phase gas stream having components or compounds in solid, liquid, or gas form in a manner that provides one or more benefits. Generally, the methods of the present invention provide for removal of one or more targeted compounds from a gas stream into a liquid scrubbing solution using, for example, absorption or scrubbing techniques. Such treatment of the gas stream may be performed as a pretreatment step to prepare the gas stream for further processing; to produce a liquid stream generated from or separated from the liquid scrubbing solution that comprises an absorbed form of the targeted compound that can be used directly, or after further processing, as a product, such as a commercial or saleable product; or to minimize or reduce the volume of liquid waste discharge that would otherwise occur upon processing of the gas stream without the use of the present invention. It should be appreciated that the absorbed form of the targeted compound is simply whichever chemical form the targeted compound takes upon being absorbed into the liquid scrubbing solution.

With respect to the pretreatment step to prepare the gas stream for further processing, the present invention may be used, for example, to reduce loading on a wastewater treatment system and provide a reduction in costs, such as operating and maintenance costs and lower sewer costs. The removal of one or more targeted gas phase compounds from the gas stream provides a gas stream that, for example, when condensed for treatment by a wastewater treatment system, will have a lower loading of that particular compound on the wastewater treatment system, which is designed to remove that particular compound. It should be appreciated that the present invention may provide a pretreatment step for other types of subsequent processing of the gas stream or a liquid stream generated from the gas stream, such as be condensing the gas stream. For example, such a pretreatment step may be useful for subsequent processing by an air scrubber for use in connection with an animal waste drying process.

With respect to providing a liquid stream comprising an absorbed form of a targeted gas compound that is removed from the gas stream, the liquid stream with the absorbed form of the gas compound may be used directly as a product. It should be appreciated that in those cases in which the gas stream comprises water, such as water vapor, the present invention provides a process that reduces or eliminates the condensation of the water contained in the gas stream during removal of the targeted compound, which may concentrate the absorbed form of the targeted compound in the liquid stream, thereby providing a more valuable product. Alternatively, the liquid stream may be subjected to additional processing to better prepare the liquid stream or the absorbed form of the targeted compound for use as a product. For example, water could be removed from the liquid stream by any method known in the art to further concentrate the absorbed form of the targeted chemical compound in the liquid stream.

With respect to reducing wastewater discharge amounts, as described above, the present invention provides a process that reduces or eliminates the condensation of the water contained in the gas stream during removal of the targeted compound. As a result, the volume of the liquid stream generated from the liquid scrubbing solution would be reduced in volume. In those cases in which the absorbed form of the targeted compound is not to be used as a product but instead is being discharged as waste, the volume of that liquid waste stream would be reduced compared to operation without the present invention. Such a lower waste discharge volume may provide cost savings, for example, in the form of lower sewer costs.

In other embodiments, the gas stream may have a relatively low water content such that condensation will not occur. Accordingly, in some cases, water from the liquid scrubbing solution may evaporate into the gas stream, which may similarly concentrate the absorbed form of the targeted compound in the liquid stream. For example, gas streams from feather dryers, which are relatively high in ammonia, may have a relatively low water vapor concentration. In some cases, the water concentration may be 20% or less. Upon treating a gas stream from such a feather dryer, water may evaporate from the scrubbing solution, further concentrating the liquid product stream and in some cases may require the addition of water to the process or scrubbing solution during or after the absorbing process of the gaseous compound. Other examples include gas steams from animal waste drying processes and from chicken litter.

In some embodiments, the gas stream may be any gas stream from which certain compounds can be removed. In some embodiments, the gas stream may be an industrial gas stream produced by a process that is separate from and upstream of the process of the present invention. In some embodiments, the gas stream may be a waste gas stream, such as a waste gas stream produced by an industrial process, such as an animal byproduct process, such as a rendering process or manure treatment process. It should be appreciated that the gas stream may contain various chemical compounds in the gas stream that may be in gaseous, liquid, or solid form. Accordingly, it should be appreciated that the methods of the present invention may provide for the removal of targeted compounds in different phases. It should also be appreciated that the methods of the present invention provide for the removal from the gas stream of more than one targeted compound. In some embodiments, the gas stream, such as those produced by animal byproduct processes, may contain fats, oils, and greases. In some cases, it should be appreciated that water in the gas stream may be in gaseous or vapor form or in liquid form, such as in the form of entrained liquid droplets or as a fog. It should also be appreciated that the gas stream temperature may be ambient or higher than ambient.

In some embodiments, the methods of the present invention are used to treat a multi-phase vapor or gas stream by removing one or more compounds from the vapor stream without or with limited or reduced condensing of the water vapor in the vapor stream or no condensation of water vapor. For example, in some embodiments, the method removes the one or more compounds from the gas stream without any condensation of the water vapor such that the water vapor in the gas stream remains in the gas stream. In some embodiments, the method removes the one or more compounds from the gas stream and reduces the amount of water vapor that would otherwise condense, thereby reducing the percentage of water vapor that would otherwise condense. In any of these embodiments, the one or more compounds can be removed by absorption or scrubbing into a liquid scrubbing solution that will result in a solubilized form of the one or more compounds in the liquid scrubbing solution that have been removed from the gas stream. Accordingly, in some embodiments, the concentration of the one or more compounds that have been removed from the gas stream is higher in the liquid scrubbing solution than if the water vapor in the multi-phase gas stream condensed and was added to the volume of the liquid scrubbing solution.

In some embodiments, the multi-phase gas stream may have been generated by, for example, a separate process in which heat has been applied to a liquid stream or a combined liquid/solids stream or slurry in that separate process, resulting in generation of the multi-phase gas stream to be treated by the present invention. For example, heat may be applied in the separate process to a liquid stream or a combined liquid/solids stream or slurry to dry or pasteurize or sterilize the liquid stream, such as in an animal byproduct process or in a rendering process. In such cases, the heat added may flash water vapor or other gaseous compounds from the liquid stream or a combined liquid/solids stream or slurry and form or become part of the multi-phase gas stream, thereby providing that gas stream with a given heat content. It should be appreciated that heat may be added to other liquid streams or materials in such other processes, including solids, resulting in flashing or generation of water vapor and other gaseous compounds that form, or become part of, the multi-phase gas stream, which would then similarly provide heat content. The resulting vapor stream or multi-phase gas stream is then processed according to the present invention to remove, absorb, scrub, or capture the one or more gaseous compounds and solubilize those compounds into a liquid stream for further processing or for use as a stand-alone product.

It should be appreciated, as described above, that in some embodiments, the removal of the one or more compounds from the multi-phase gas stream provides significant benefits. In some embodiments, by removing these targeted compounds from the gas stream, subsequent processing of that gas stream without or with a lower concentration of those particular compounds can be done more efficiently or without the same loading on burden on the subsequent processing operations. For example, in embodiments in which the gas stream, after removal of the one or more gaseous compounds or target compounds is then condensed into a liquid stream for subsequent treatment in a wastewater process or facility, the loading of those particular compounds on the wastewater treatment process is lower, thereby lowering the burden on the wastewater treatment process and effectively reducing costs associated with operation of the wastewater treatment facility and the discharge of any liquid stream from the wastewater treatment process, such as reduced sewer costs or costs otherwise associated with having to operate the wastewater treatment system, for example, near or above its recommended or on-site capacity.

As described below, ammonia may be one of the gaseous compounds or targeted compounds in the multi-phase gas stream. In such cases, the method of the present invention can act as a pretreatment process for a subsequent wastewater treatment process. Specifically, the method of the present invention provides a gas stream exiting from the process of the present invention with a lower ammonia concentration. Upon condensing this exit gas stream to condense components, such as ammonia, in the gas stream and produce a liquid stream that is processed by a wastewater treatment system, the amount of ammonia in that liquid stream will be reduced. Without removal of at least a portion of this ammonia, a greater portion of the ammonia will be co-condensed with water vapor and transferred into a liquid stream that will be subjected to treatment in a wastewater treatment facility. Accordingly, the wastewater treatment facility will see a correspondingly higher load of ammonium from this condensed gas stream. By removing at least a portion of the ammonia, the load on the wastewater treatment facility will be reduced, in some cases significantly, compared to no removal of ammonia from the gas stream. This can provide significant cost savings, including operational costs and disposal or sewer costs related to the wastewater treatment facility. Accordingly, it should be appreciated that the removal of certain compounds from the gas stream being treated may result in lower biological oxygen demand (BOD) in connection with operation of a wastewater treatment system that, in turn, may provide significant cost savings. For example, reducing the ammonia concentration in the gas stream will ultimately reduce the nitrogen load and BOD on the wastewater treatment system and provide significant cost savings. This may provide benefits such as more stable reactor operation, reduced number of upset conditions that would otherwise kill bacteria caused by excessive nitrogen loading shifts, the ability to expand the system based upon the reduced nitrogen loading, and reduced ammonia discharge from the biological digester system.

Alternatively, the method of the present invention provides a liquid stream comprising an absorbed form of the ammonia that can be used directly as a fertilizer or further processed to generate a fertilizer product, such as a dried fertilizer. As noted, the gas stream may comprise water, which may be in a gaseous form or in droplet form entrained in the gas stream. In this case, the present invention provides for absorption of the targeted gas phase compound in a liquid scrubbing solution while reducing or eliminating the amount of water that would otherwise condense or be collected by the scrubbing solution in the gas/liquid contactor. By reducing such condensation, dilution of the concentration of the absorbed targeted compound in the scrubbing solution would be reduced in proportion to the amount of condensation that is otherwise reduced. In other words, a higher concentration of the absorbed targeted compound can be realized in the scrubbing solution, with all other operating parameters and conditions being the same, which is advantageous for purposes of further processing or use. As a result, the concentration of the absorbed form of the targeted gas phase chemical compound will be proportionally higher in the liquid product stream as well.

It should also be appreciated that in some embodiments, an additive can be added to the gas stream prior to absorption or upstream of the gas/liquid contactor or to the scrubbing solution. The additive may be used to interact with the targeted chemical compound (or the absorbed form of the targeted chemical compound) to form one or more "temporary" intermediate compounds derived from the additive and the targeted chemical compound. This intermediate compound subsequently dissociates to provide the additive and the absorbed form of the targeted chemical compound in the liquid scrubbing solution and ultimately in the liquid product stream. Accordingly, in some embodiments, the absorbed form of the targeted chemical compound is ultimately produced in the liquid product stream as if the additive had never been used.

In embodiments in which the additive is added to the gas stream, the additive may be absorbed into the liquid scrubbing solution concurrently with the targeted chemical compound and form a dissociation of the absorbed additive and the targeted chemical compound. Alternatively, in some embodiments, the additive may react with the targeted gas phase chemical compound in the gas phase to produce the intermediate compound in the gas stream, which may be in the form of a gaseous, liquid, or solid compound. This gaseous, liquid, or solid intermediate compound is then absorbed into the liquid scrubbing solution to produce an absorbed form of the intermediate compound. This absorbed form of the intermediate compound is then dissociated to release the targeted chemical compound, thereby essentially providing the absorbed form of the targeted chemical compound in the liquid scrubbing solution. It should be appreciated that both mechanisms may be used concurrently or separately depending upon the additive. The additive may also be added to the gas stream and absorbed in the scrubbing solution separately from the targeted chemical compound to increase the solubility of the targeted gas phase chemical compound.

In some embodiments the additive can be added to the gas stream upstream of the gas/liquid contactor or the absorption process by any means known in the art. In some embodiments, the additive may be added to a liquid solution that is then added to the gas stream upstream of the gas/liquid contactor or the absorption process by any means known in the art, such as by injection or by being sprayed into the gas stream. The addition rate of the additive to the gas stream can be adjusted relative to the operation of the gas/liquid contactor and desired removal of the targeted chemical compound to provide the proper residence time for reaction in the gas phase if that mechanism is applicable.

It should be appreciated that the additive may be a gas phase chemical compound that is different from the targeted chemical compound. In some embodiments, the additive may be a liquid or solid compound. It should also be appreciated that more than one additive may be used and added to the gas stream. In some embodiments, there may be more than one targeted chemical compound to be removed from the gas stream and more than one additive. In some embodiments, there may be a specific additive used for each targeted chemical compound. In some embodiments, the additive may be the same for each targeted chemical compound.

In some embodiments, the targeted chemical compound is ammonia, and the additive is gaseous carbon dioxide. In one embodiment, carbon dioxide can be added to the gas stream, and ammonia and the carbon dioxide will be absorbed and react with water in the gas stream to form ammonium carbamate as a solid in the gas stream, which, upon absorption in a gas/liquid contactor into the liquid scrubbing solution, dissociates into carbamate anion and ammonium, the latter being the absorbed form of the targeted chemical compound. In another embodiment, the carbon dioxide may be added to the scrubbing solution and similarly react with the absorbed ammonia to produce a dissociated carbamate anion and ammonium.

In yet another general embodiment, the present invention provides a process for the successive removal of the targeted chemical compound as well as other various components by the various, sequential process operations, from the initial gas stream being treated or additional gas streams added to the process. Accordingly, in these embodiments, this effect ultimately reduces the burden on any subsequently used oxidizer, which may include any thermal oxidizer, such as a thermal oxidizer or a regenerative thermal oxidizer, or a boiler or other combustion device. For example, focusing on ammonia as the targeted chemical compound in the gas stream, the removal of ammonia through the process results in the removal of a significant portion, if not all, of the ammonia. Therefore, the gas stream will provide a relatively lower load of ammonia on any subsequently used oxidizer. Since ammonia is a precursor to formation of $NO_x$ compounds in an oxidizer, the reduction in ammonia will provide a much lower formation rate and amount of $NO_x$ compounds in the oxidizer and the gas discharge from the oxidizer. Similarly, the process provides the ability to reduce the $SO_x$ loading to the oxidizer, thereby reducing the $SO_x$ emissions from the oxidizer. Further, it should be appreciated that process provides the ability to reduce the particulate matter (PM), including PM 2.5, in the gas stream from the oxidizer and hydrogen sulfide. Since PM is formed post combustion from the combination of ammonia and hydrogen sulfide to form ammonia sulfate, the reduction of these reactants by the various process operations in the overall process, will result in lower formation of PM. Reducing the concentration of ammonia as described above and reducing the concentration of hydrogen sulfide will reduce the formation of PM and the amount of PM discharged. In other more specific embodiments, the process may utilize various process modifications, such as adding heat to the process or adding air to the gas stream being treated.

In some embodiments, the gas stream may be a waste gas stream generated in an animal waste process that processes waste animal tissue or animal parts, such as rendering. For example, the waste gas stream may be one or more gas streams generated by cooking, drying, concentrating (e.g., evaporating water and producing a water vapor gas stream), hydrolyzing (e.g., hydrolyzing of chicken feathers or pig hair), or blood drying processes. The present invention provides the ability to remove a targeted chemical compound, such as ammonia, from these gas streams prior to any condensing operation, thereby reducing or eliminating the collecting or condensation of ammonia in the water that is otherwise condensed. By reducing or eliminating the ammonia content in such condensate, a reduction in the burden on any subsequent wastewater treatment system is realized. It should be appreciated that many processes typically condense the water vapor in a given waste gas stream prior to any subsequent treatment of the waste gas stream, thereby removing various chemical compounds from the gas stream with the condensate. Such places a significant burden on any subsequent wastewater treatment system, even in those processes where the concentration of the targeted chemical compound, such as ammonia, is present in the condensate in a relatively low amount. The present invention reduces or eliminates this issue. Even treating a gas stream with a significant amount of water vapor and relatively lower amount of a given targeted chemical compound, such as ammonia, with the methods of the present invention, allows for the removal of that targeted chemical compound prior to condensation, thereby reducing or eliminating the burden otherwise placed on the wastewater treatment system due to the presence of the targeted chemical compound in the condensate.

Following, various specific embodiments of the present invention are described in connection with each of the Figures. The description associated with each figure may describe various alternatives, including various process configurations and equipment, as well as additional features and aspects of the present invention. However, these descriptions should not be viewed as limiting or required for the overall present invention.

FIG. 1 is a process flow diagram illustrating a process for removing a targeted chemical compound from a gas stream to produce a gas stream for subsequent treatment or to produce a liquid stream comprising an absorbed form of the targeted compound for use as a saleable product either directly or after further processing, according to one embodiment of the present invention. The process 100 shown in FIG. 1 illustrates the processing of a gas stream 102 comprising a targeted chemical compound. The gas stream 102 is passed to a gas/liquid contactor 104. The gas stream 102 may be any gas stream that has a targeted chemical compound, which may be in gaseous, liquid, or solid form in the gas stream. For example, the gas stream may be a waste gas stream from an industrial process, such as a rendering process or an animal manure drying process. In some embodiments, the gas stream may be a heated gas stream or a gas stream produced by a piece of equipment that imparts heat to the gas stream, such as a dryer in a rendering process or a manure or animal waste dryer, thereby providing a gas stream with a given heat content. It should be appreciated that the gas stream may also comprise various other chemical compounds, including compounds that may be in gaseous, liquid, or solid form in the gas stream. For example, a waste gas stream generated by a dryer in a rendering process may contain fats, oils, and greases.

The targeted chemical compound is a chemical, the removal of which provides a gas stream for further processing or that has value in that it can be subsequently processed resulting in operational efficiencies or cost savings. For example, the removal of a particular targeted chemical compound may provide a gas stream with a lower concentration of the targeted gas phase chemical compound that may be more easily processed as a result. In other words, the removal of the targeted compound reduces the amount of further processing or improves the efficiency or operation of such further processing. For example, the gas stream may contain compounds that must be removed prior to discharge to comply with certain emission regulations. In some embodiments, these compounds may be removed by condensing the gas stream, thereby condensing certain components and forming a liquid stream that is treated by a wastewater treatment system. In this case, the process of the present invention acts as a pretreatment step for the wastewater treatment system by removing a targeted chemical compound from the gas stream that may reduce the burden on the subsequent wastewater treatment system. For example, in some embodiments, the targeted chemical compound may be ammonia. By removing ammonia from the gas stream, subsequent condensation of the gas stream to condense other compounds that must be removed into a liquid stream that is treated by a wastewater treatment system, results in lower ammonium concentration in that liquid stream, thereby reducing the burden or load of ammonium on the wastewater treatment system.

The targeted chemical compound may also be a compound having commercial value. In such embodiments, the process 100 can be used to produce a liquid stream comprising an absorbed form of the targeted compound that can be used directly, or after further processing, as a product, such as a commercial or saleable product. It should be appreciated that in some embodiments the targeted chemical compound may be captured from the gas stream and provided in solution as a product or isolated and provided in that isolated form as a product. In some embodiments, the targeted chemical compound is gas phase ammonia, the recovery of which, either as a solution or in a subsequently dried form, can be used as a general fertilizer or soil amendment.

In some embodiments, the targeted chemical compound is gas phase ammonia, the recovery of which as a solution can be used as a fertilizer or soil amendment in an organic farming process that produces certified organic food products. One requirement for agricultural operations that produce "organic" agricultural products is that such products must be produced without the use of synthetic chemicals. Accordingly, "organic" agricultural products must be produced using natural or non-synthetic substances. In fact, any natural or non-synthetic substance or chemical can be used in organic farming unless specifically prohibited by the USDA. The USDA maintains a list of allowed and prohibited natural substances, which is known as the "National List of Allowed and Prohibited Substances" ("National List"). The National List is well-known in the organic farming industry and is readily available from the USDA. As an example, some natural substances that are prohibited from being used in organic farming include arsenic and strychnine. It should be appreciated that various states, agencies, and other organizations maintain lists of approved materials, such as the California Department of Food and Agriculture, Washington State University, and the Organic Materials Review Institute.

One substance or chemical that an organic farming operation may use is a soil amendment or fertilizer. Accordingly, to be compliant with the National Organics Program (NOP) statutes, rules, and regulations, such a fertilizer must be a natural or non-synthetic substance. The NOP at 7 U.S.C. § 6502(21) defines "synthetic" as "a substance that is formulated or manufactured by a chemical process or by a process that chemically changes a substance extracted from naturally occurring plant, animal, or mineral sources, except that such term shall not apply to substances created by naturally occurring biological processes."

Moreover, the USDA provides a well-known procedure for determining whether a substance is synthetic or non-synthetic. This procedure is found in the National Organic Program Handbook provided by USDA ("Handbook"). The Handbook provides guidance, instructions, and policy memos to assist with compliance with NOP rules and regulations. The procedure for determining whether a substance is synthetic or non-synthetic is entitled "Guidance: Decision Tree for Classification of Materials as Synthetic or Nonsynthetic," which is found in the Handbook at Section A Standards, NOP 5033-1. Provided the ammonia in the gas stream 102 is not synthetic, its recovery using the process 100 shown in FIG. 1, may provide a liquid stream containing the ammonium, which can be used as a fertilizer or soil amendment in an organic farming process.

The gas/liquid contactor 104 may be any gas/liquid contactor known in the art, such as, but not limited to, a spray tower, a tray absorber, or a bubbler. The gas/liquid contactor 104 may be operated in a counter-current fashion, co-current fashion, or cross-current fashion or in any other manner that provides sufficient contact between a gas and a liquid. It should be appreciated that more than one gas/liquid contactor 104 may be used in series or in parallel. The gas/liquid contactor 104 is operated by passing a liquid scrubbing solution 106 through the gas/liquid contactor 104 such that the gas stream 102 is contacted by the liquid scrubbing solution 106. The targeted chemical compound is absorbed or scrubbed by the liquid scrubbing solution 106. Accordingly, the composition of the liquid scrubbing solution 106 may be adapted to enhance absorption of the targeted chemical compound. In such cases, chemicals may be added to the liquid scrubbing solution, for example, to replenish any chemicals depleted during absorption.

Additionally, pH control may be used for absorption of certain acidic or basic targeted chemical compounds. During absorption, the targeted chemical compound passes from the gas stream 102 into the liquid scrubbing solution 106. The pH may be selected based upon the specific targeted chemical compound being removed and may be controlled at that pH during operation using the addition of acid or base as necessary using either feedback or feedforward control. It should be appreciated that any acid may be used that is compatible with the overall system chemistry, including the desired end use of the liquid stream comprising the absorbed form of the targeted compound in those cases in which the liquid stream is a desired product. In some embodiments, such control can be done through the addition of the acid or carbon dioxide addition as described above. Further, such pH control can be either feedback or feedforward control In operation, the process of the present invention provides for the absorption of the targeted chemical compound from the gas stream 102 into the liquid scrubbing solution 106. Once absorbed, the targeted chemical compound is converted into an absorbed form, which is the chemical composition into which the targeted chemical compound is converted upon absorption in the scrubbing solution 106. The specific chemical composition of the absorbed form depends upon the specific composition and phase of the targeted chemical compound and the composition of the scrubbing solution 106. Accordingly, in some embodiments, the absorbed form may simply be the hydrated form of the targeted chemical compound. In one embodiment, that targeted chemical compound is ammonia, and the liquid scrubbing solution 106 may be any solution capable of absorbing ammonia, such as an acidic-based solution. The absorbed form of the ammonia may be ammonium hydroxide or ammonium cation.

The scrubbing solution 106 can be recycled through the gas/liquid contactor 104. In this case, the liquid scrubbing solution 106 is fed to the gas/liquid contactor 104 in which it contacts the gas stream 102 resulting in absorption of the targeted chemical compound into the scrubbing solution 106. The scrubbing solution 106 then exits the gas/liquid contactor 104 as a scrubbing solution with the absorbed form of the targeted chemical compound 108. The liquid scrubbing solution 106 is fed from a feed tank or sump 110, and the liquid scrubbing solution with the absorbed from of the targeted gas phase chemical compound 108 from the gas/liquid contactor 104 may be collected in the same feed tank or sump 110. Alternatively, it should be appreciated that the liquid scrubbing solution 106 may be used as a single-pass or in a once-through fashion such that the liquid scrubbing solution only passes through the gas/liquid contactor 104 one time. After absorbing the targeted gas phase chemical compound from the gas stream 102, the gas stream 102 exits the gas/liquid contactor 104 as an exit gas stream 112 with a lower concentration of the targeted gas phase chemical compound.

A portion of the liquid scrubbing solution held in the feed tank 110 is discharged as a liquid stream or product stream 114. This product stream 114 is a liquid solution containing the absorbed form of the targeted chemical compound. The product stream 114 can be used directly, or after further processing, as a product, such as a commercial or saleable product, which may include its use in another process. Such further processing may include, for example, processing the product stream 114 to isolate the absorbed form of the targeted chemical compound for further use, such as drying the product stream 114 to provide a dried form of the absorbed targeted compound. In one embodiment, the targeted chemical compound is ammonia such that the product stream 114 may be a liquid stream comprising ammonium hydroxide or ammonium cation that can be used directly as a fertilizer. Alternatively, or in addition, the product stream 114 can be further processed, for example, by removing water to concentrate the ammonium and provide a dried form of the ammonium for use as a fertilizer. It should be appreciated that in some embodiments, described further below, the dried form of the ammonium may be ammonium hydroxide, ammonium acetate, ammonium citrate, or other dried form of the targeted compound. It should be appreciated that in some embodiments, it may be desirable to rehydrate the dried form of the targeted compound at the point of use, which can be easily done by any means known in the art.

In another alternative embodiment in which the targeted chemical compound is ammonia, and in which the process is implemented in the same manner as shown in FIG. 1, the liquid scrubbing solution 106 can be operated at an acidic pH by adding an acid, such as any inorganic acid or organic acid, such as citric acid, to the scrubbing solution 106. The use of an acid acts to increase the solubility, and therefore the removal, of the ammonia from the gas stream 102. Accordingly, this embodiment enables treatment of a gas stream having a relatively higher concentration of ammonia. It should be appreciated that the acid may be added to the liquid scrubbing solution 106 as it is fed to the gas/liquid contactor 104 or it may be fed to the feed tank 110. Alternatively or in addition, the acidic solution can be sprayed into the gas stream 102 upstream of the gas/liquid contactor 104. In some alternative embodiments, carbon dioxide can be injected into the liquid scrubbing solution 106 to reduce or control the pH. It should be appreciated that the acid can be added as a solution by spraying the acidic solution into the gas stream 102 upstream of the gas/liquid contactor 104. Similarly, the carbon dioxide can be added to the gas stream 102 upstream of the gas/liquid contactor 104 or sparged or bubbled into the feed tank 110.

It should be appreciated that the acid can be used to react with absorbed ammonia to produce a corresponding dissociated ammonium in solution constituting a product for use as a fertilizer. For example, citric acid can be added to produce dissociated ammonium citrate in solution. Alternatively, in one embodiment, the acid can be added to the liquid product stream 114, as opposed to the circulating liquid scrubbing solution 106, to form the corresponding dissociated ammonium in solution. It should also be appreciated that if the acid is an organic acid that is approved for use in producing a fertilizer or soil amendment, such as a non-synthetic or natural organic acid, the liquid product stream 114 can be used in organic farming to produce certified organic products. It should be appreciated that any organic acid may be used, including organic acids similar to citric acid, such as acetic acid, lactic acid, humic acid, or gluconic acid or other fermented acids. It should also be appreciated that other acids, including synthetic or non-synthetic acids may be used, such as sulfuric, nitric, phosphoric, and hydrochloric acids.

As described above, the pH of the liquid scrubbing solution 106 can be adjusted using these particular acids as well to provide for absorption of the targeted gas phase chemical compound. Further, the pH of the scrubbing solution 106 can be controlled at a given pH setpoint for such purposes. Such control can be done through the addition of the acid or carbon dioxide addition as described above. Further, such pH control can be either feedback or feedforward control.

It should also be appreciated that the gas stream 102 may have other compounds present. However, the present invention provides the ability to identify and remove more than one targeted gas phase chemical compound from the gas stream amongst the other compounds present. For example, in a rendering process, the gas stream emitted from the dryer or other equipment in the rendering process may have other components in the gas stream, including, for example, fats, oils, and greases. Regardless, the present invention provides the ability to remove the targeted compound, ammonia, from the gas stream despite the presence of fats, oils, and greases. It should also be appreciated that the gas stream 102 may be a gas stream from manure or other waste solids drying processes, despite the presence of other gas phase chemical compounds in the gas stream, and treated as described by the methods of the present invention.

In one embodiment, the present invention provides the ability to reduce, minimize, or eliminate condensation of water vapor in the gas stream fed to the gas/liquid contactor. With reference to FIG. 1, the gas stream 102 may comprise water that otherwise condense in the gas/liquid contactor 104 depending upon the temperature therein. Typically, if the temperature of the gas/liquid contactor 104 is below the dew point for the gas stream 102, water in the gas stream 102 will condense and combine with or add to the liquid scrubbing solution 106. Depending upon the amount of condensation, the added water content will dilute the concentration of the absorbed form of the targeted chemical compound in the liquid stream 108 exiting the gas/liquid contactor 104 and the liquid product stream 114. To reduce, minimize, or eliminate this dilution effect, the temperature of the gas/liquid contactor 104 should be high enough to at least reduce condensation of the water in the gas/liquid contactor 104. Therefore, the present invention, in some embodiments, is particularly suited to treating gas streams 102 that are already at a sufficiently high temperature, provided that any temperature drop in the gas stream 102 through the gas/liquid contactor 104 remains sufficiently low enough to reduce any condensation to the desired amount or an acceptable level. It should be appreciated that in some embodiments, the temperature of the gas/liquid contactor may be sufficiently high such that removal of the targeted chemical compound may be somewhat relatively lower. In this case, the concentration of the absorbed form of the targeted chemical compound may be increased to the desired level, for example, by evaporating water from the product stream 114.

In some embodiments, to reduce, minimize, or eliminate this dilution effect, the temperature of the liquid scrubbing solution 106 can be increased prior to feeding to the gas/liquid contactor 104, by optionally providing heat 116 (as represented by the dashed line) to the liquid scrubbing solution 106. The heat 116 may be supplied by any means known in the art, including direct heating methods and equipment or with heat exchangers, and may be applied to the feed tank 110 or to the liquid scrubbing solution 106 as it passes from the feed tank 110 to the gas/liquid contactor 104. The temperature setpoint for the liquid scrubbing solution 106 can be greater than, the same, or less than the temperature of the gas stream 102, depending upon the amount of condensation to be avoided. For example, if condensation of any water vapor in the gas stream 102 is to be avoided, the temperature of the liquid scrubbing solution 106 needs to be the same or greater than the temperature of the gas stream 102. Alternatively, if only a fraction of the possible condensation is to be avoided the temperature of the liquid scrubbing solution 106 can be adjusted accordingly, including to a temperature less than the temperature of the gas stream 102. The specific temperature selected to cause a reduction in the amount of condensation of water vapor in the gas stream 102, compared to the amount of condensation that would otherwise occur without heating the liquid scrubbing solution 106. It should be appreciated that the liquid scrubbing solution 106 can be heated by any means known in the art. Further, it should be appreciated that the liquid scrubbing solution 106 can be heated inline prior to feeding to the gas/liquid contactor 104 or alternatively or in addition, the feed tank 110 can be heated. It should be appreciated, however, that in some cases, depending upon the temperature of the gas stream 102 and its water content, it may not be necessary to heat the scrubbing solution 106.

It should be appreciated that in some embodiments, the temperature of the gas stream 102 may be increased to achieve the desired reduction in water condensation by optionally applying heat 118 to the gas stream (as represented by the dashed line) prior to entering the gas/liquid contactor 104. Similarly, the heat 118 may be supplied by any means known in the art, including direct heating methods and equipment or with heat exchangers. In these cases, the temperature can be selected to provide the appropriate temperature within the gas/liquid contactor 104 as described above when heating the scrubbing solution 106.

In some embodiments, the gas stream may have a relatively low water concentration such that condensation is less likely to occur. For example, gas streams from feather dryers, which are relatively high in ammonia, may have a relatively low water concentration. In some cases, the water concentration may be 20% or less. Upon treating a gas stream from such a feather dryer, water may evaporate from the scrubbing solution, further concentrating liquid product stream. In some cases, water may need to be added to makeup for the water evaporated from the scrubbing solution.

In yet another embodiment, the process 100 provides an exit gas stream 112 that exits the gas/liquid contactor 104 having a lower concentration of the targeted gas phase chemical compound. This provides a benefit with respect to subsequent processing of the exit gas stream 112 by virtue of the lower concentration of the targeted compound. For example, in cases in which the targeted compound is ammonia, the exit gas stream 112 will have a relatively lower concentration of ammonia due to absorption of ammonia in the gas/liquid contactor 104. In cases in which the exit gas stream 112 will be condensed in a condenser 124 to remove additional compounds from the gas stream, for example, to meet any regulatory discharge requirements, following by treatment of the resulting liquid stream prior to discharge, such as treatment in a wastewater treatment facility 126, the condensation will produce a liquid stream also having a relatively lower ammonium concentration. As a result, the nitrogen loading that would otherwise pass to the wastewater treatment facility will be similarly reduced, thereby improving operation of the wastewater treatment facility, which discharges a liquid 128 for disposal.

In yet another embodiment, the present invention provides methods for addressing treatment of other liquid streams that may be generated, for example, by the same process that generates the gas stream to be treated by the present invention or even by the methods of the present invention. With reference to FIG. 1, one or more liquid streams 120 may be added to the feed tank or sump 110 or to the recycle liquid scrubbing solution 106 or both. In this case, the one or more liquid streams 120 become part of the liquid scrubbing solution 106 and, in effect, contribute to the volume of water in the feed tank 110 and the liquid scrubbing solution 106 being recirculated through the gas/liquid contactor 104. As the process 100 is operated, water will evaporate in the gas/liquid contactor 104, thereby ultimately evaporating or stripping the additional water added by the one or more liquid streams 120.

It should be appreciated that the one or more liquid streams 120 may be one or more liquid waste streams generated by the process from which the gas stream treated by the present invention is generated. Alternatively, the one or more liquid streams 120 may be a liquid waste stream generated by the methods of the present invention. For example, condensation collected from gas ductwork or other liquid wastes may be included. Accordingly, it should be appreciated that any liquid stream may be included or added to the feed tank or sump 110 or to the recycle liquid scrubbing solution 106 or both.

It should also be appreciated that the ability to add other liquid streams to the process of the present invention provides some operational flexibility. For example, during a process upset or if the process of the present invention is down and not operating, the gas stream intended to be treated may need to be condensed. However, in this case, the wastewater treatment system may be unable to accommodate treatment of a corresponding condensed gas stream since the targeted compounds have not been removed. In this case, the condensed liquid can be stored, resulting in storage of a certain volume of water containing a more dilute concentration of the targeted compound. Later, during normal operation, this stored liquid can be fed to the feed tank 110 as a liquid stream 120 to ultimately dispose of the collected liquid and to recover the targeted compound in the liquid scrubbing solution 106.

In some embodiments in which one or more liquid streams 120 are being added, ambient air 122 may be injected or added to the gas/liquid contactor 104, for example, at the point where the gas stream 102 enters using a valve or a pump if necessary depending upon the pressure inside the gas/liquid contactor 104. This air stream 122 can be used to assist in evaporation of water to effectively remove the amount of water being added by the one or more liquid streams 120. For example, this air stream 122 may flash water from the liquid scrubbing solution 106. In some embodiments, the addition of this air stream 122 may be coupled with heating of the liquid scrubbing solution using the heat input 116 or heating of the gas stream using the heat input 118 or both.

Figure 2:
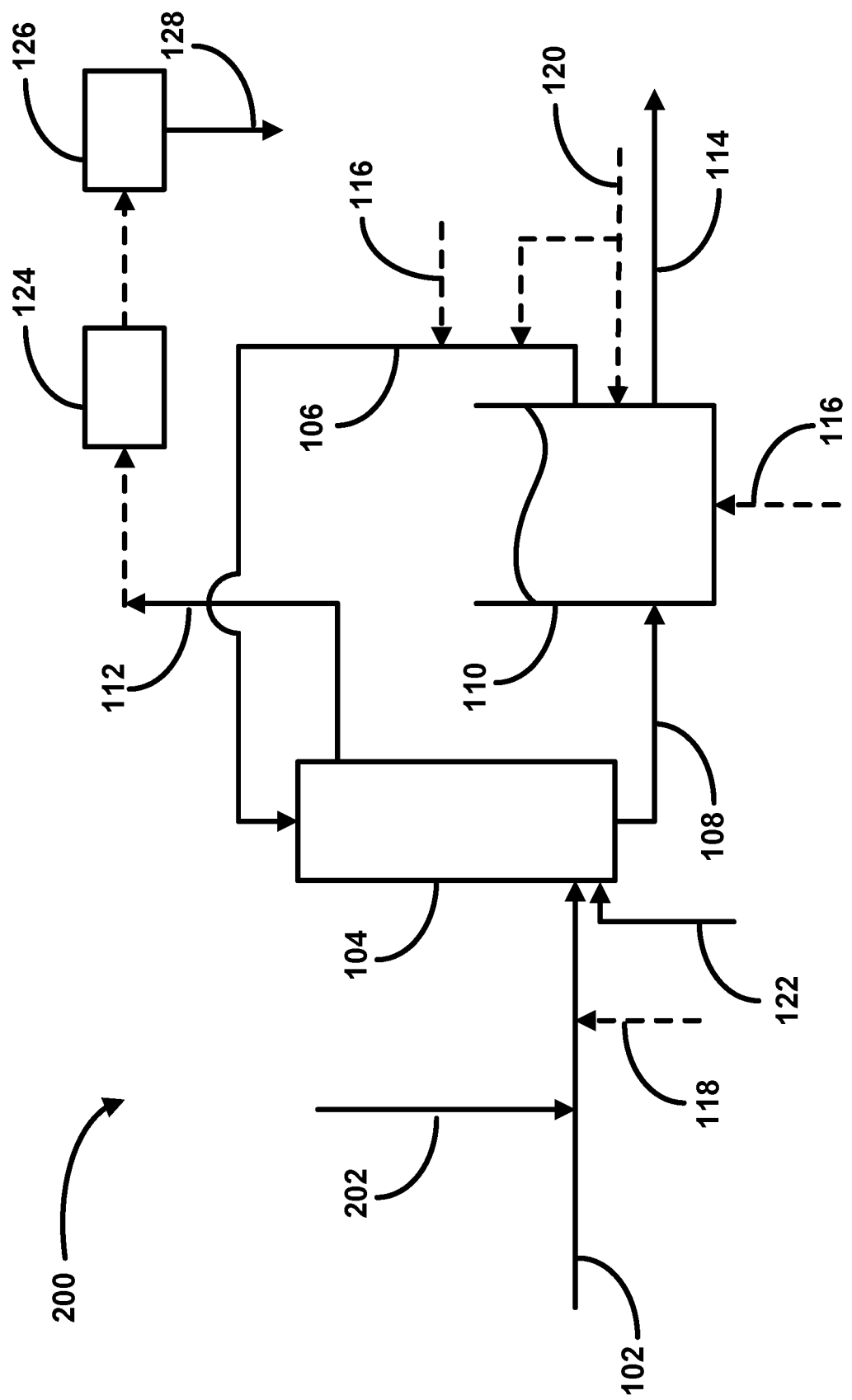
FIG. 2 illustrates a process flow diagram of a portion of the process shown in FIG. 1 with additional processing features according to one embodiment of the present invention.

FIG. 2 is a process flow diagram illustrating anther process for removing a targeted gas phase chemical compound from a gas stream to produce a liquid stream comprising an absorbed form of the targeted compound for subsequent processing or use according to another embodiment of the present invention. The process 200 of FIG. 2 is similar to the process shown in FIG. 1 with the exception that an additive 202 is added to the gas stream 102 upstream of the gas/liquid contactor 104. As described above, the additive is used to increase the solubility of the targeted compound in the scrubbing solution 106. Accordingly, the additive may be concurrently absorbed with the targeted compound into the liquid scrubbing solution 106. In some cases, the additive may form a disassociation with the targeted compound in the liquid scrubbing solution 106. In some cases, the additive may form an alternative form of the targeted chemical compound in the liquid scrubbing solution 106. For example, the additive may bond to or react with the targeted compound in the liquid phase, to increase the solubility of the targeted gas phase chemical compound (or the absorbed form of the targeted gas phase chemical compound) to form one or more "temporary" intermediate compounds derived from the additive and the targeted gas phase chemical compound. This intermediate compound is soluble in the liquid scrubbing solution 106. It should be appreciated, however, that the reaction between the two absorbed species may occur immediately upon their absorption and such reaction may continue in the feed tank 110.

Alternatively, in some embodiments, the additive may react with the targeted gas phase chemical compound in the gas phase to produce a temporary intermediate compound as a gaseous or solid compound. This gaseous or solid intermediate compound is then absorbed into the liquid scrubbing solution 106 to produce an absorbed form of the gaseous intermediate compound. This absorbed form of the gaseous intermediate compound is then dissociated to release the targeted chemical compound thereby essentially providing the absorbed form of the targeted chemical compound and a corresponding absorbed form of the additive in the liquid scrubbing solution. It should be appreciated that both mechanisms may be used concurrently or separately depending upon the additive. Accordingly, the addition of the additive to the gas stream can be adjusted relative to the gas/liquid contactor 104 to provide the proper residence time for reaction in the gas phase if that mechanism is used.

In one embodiment, the targeted gas phase chemical compound is ammonia, and the additive is gaseous carbon dioxide, which is added to the gas stream 102 as a gaseous stream 202 of carbon dioxide. In this case, ammonia and the carbon dioxide will react to form a carbonate as the intermediate compound, which is then absorbed into the scrubbing solution 106 in the gas/liquid contactor 110. Upon absorption, the intermediate compound dissociates in the liquid scrubbing solution 106 to carbamate anion and ammonium, the former being the absorbed form of the carbon dioxide and the latter being the absorbed form of the targeted gas phase chemical compound. Accordingly, the liquid scrubbing solution in the feed tank 110 will contain the desired absorbed form of the targeted gas phase chemical compound. In this case, dissociated ammonium. Therefore, the product stream 114 from the feed tank 110 will contain the desired form of the targeted compound for direct use as a fertilizer or for further processing as described above in connection with FIG. 1.

In some embodiments, the additive may be an acid, which can be used to increase the solubility of the targeted compound and result in a dissociation in the scrubbing solution between the absorbed targeted compound and the acid. For example, when the targeted compound is ammonia, the use of an acid as an additive, for example, added to the scrubbing solution, would effectively increase the solubility of the ammonia in the scrubbing solution. In this case, the absorbed ammonia would form a dissociation with the acid in the scrubbing solution.

In some embodiments, the absorption of the targeted compound results in a dissociated form of the targeted compound and the acid. In addition, an acid can be used to react with absorbed ammonia to produce a corresponding dissociated ammonium in solution constituting a product for use as a fertilizer. Also, an organic acid that is approved for use in producing a fertilizer or soil amendment, such as a non-synthetic or natural organic acid, can be used in organic farming to produce certified organic products. It should be appreciated that any organic acid may be used, including organic acids similar to citric acid, such as acetic acid, lactic acid, humic acid, or gluconic acid or other fermented acids. It should also be appreciated that other acids, including synthetic or non-synthetic acids may be used, such as sulfuric, nitric, phosphoric, and hydrochloric acids. Also, as described above in connection with FIG. 1, carbon dioxide gas can be sparged into the feed tank 110, in the line supplying the scrubbing solution 106 to the gas/liquid contactor 104, or in the line conveying the scrubbing solution with the absorbed form of the targeted gas phase chemical compound 108. In some embodiments, the carbon dioxide may be organically derived or non-synthetic, such as, for example, carbon dioxide gas derived from the biodigester, that could be used to generate the liquid product stream 114 for use in organic agriculture.

It should be appreciated that all of the alternatives described above in connection with FIG. 1 apply equally to the process 200 shown in FIG. 2. For example, the liquid scrubbing solution 106 can be operated at an acidic pH by adding acid, such as an inorganic or organic acid, such as citric acid, to the solution. The use of such an acid acts to increase the solubility, and therefore the removal, of the ammonia from the gas stream 102. Accordingly, this embodiment enables treatment of a gas stream having a relatively higher concentration of ammonia. It should be appreciated that the acid may be added to the liquid scrubbing solution 106 as it is fed to the gas/liquid contactor 106 or it may be fed to the feed tank 100.

It should also be appreciated that the processes of either FIG. 1 or FIG. 2 may be used to remove ammonia or other targeted compounds prior to a wastewater treatment system without the use of any heating, such as heat 116 added to the liquid scrubbing solution 106 or heat 118 added to the gas stream 102. In this case, the processes of FIG. 1 or FIG. 2 can be used upstream of a wastewater treatment system to remove the ammonia before condensing the gas stream thus reducing the nitrogen loading on the wastewater treatment system, which may include ammonia digestion and biological nitrifiers. In some embodiments, this may provide benefits such as more stable reactor operation, reduced number of upset conditions that would otherwise kill bacteria caused by excessive nitrogen loading shifts, the ability to expand the system based upon the reduced nitrogen loading, and reduced ammonia discharge from the biological digester system. In this case an inorganic acid may be used when this process is utilized as a pretreatment step and where the objective is not to produce a fertilizer suitable for organic agriculture or farming.

Additionally, the processes of FIG. 1 or FIG. 2 may be similarly used to reduce $NO_x$ compounds and particulate in the gas stream 102. A reduction in these compounds would similarly reduce any detrimental effects they cause on the wastewater treatment system.

Figure 3:
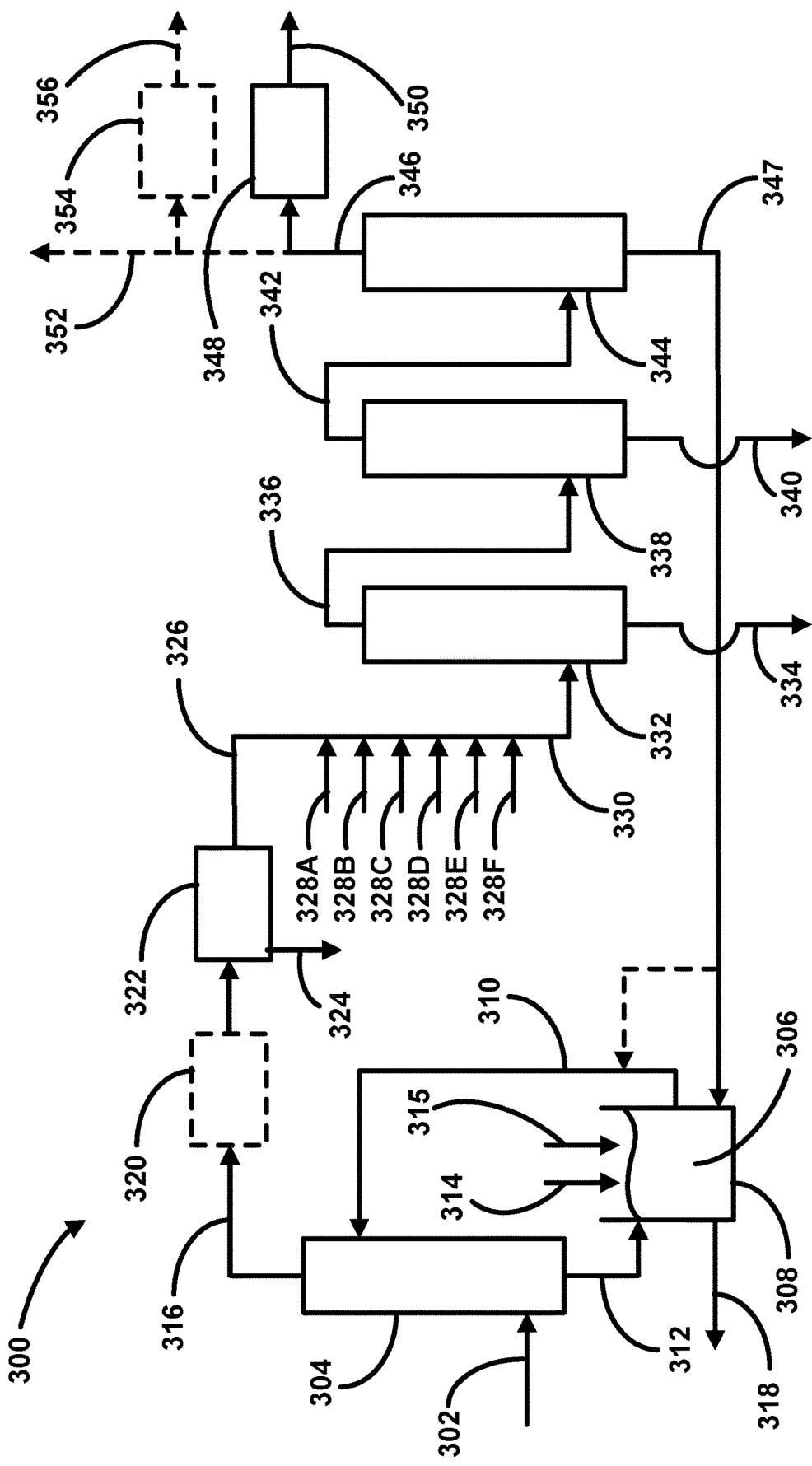
FIG. 3 illustrates a process flow diagram for a process for removing a targeted chemical compound from a gas stream to produce a gas stream for subsequent treatment or to produce a liquid stream comprising an absorbed form of the targeted compound for use as a saleable product (either directly or after further processing) according to one embodiment of the present invention.

FIG. 3 illustrates a process flow diagram for a process for removing a targeted chemical compound from a gas stream to produce a gas stream for subsequent treatment or to produce a liquid stream comprising an absorbed form of the targeted compound for use as a saleable product (either directly or after further processing) according to one embodiment of the present invention. FIG. 3 illustrates another general embodiment of the present invention.

The process 300 begins with the passing of a gas stream 302 that may contain various components or chemicals, including the targeted chemical compound, such as one or more gas phase nitrogen-based compounds, to be removed or recovered from the gas stream 302. The gas stream 302 may be any gas stream derived from any industrial process that results in the production of a gas stream having one or more chemical compounds to be removed or recovered, such as gas phase nitrogen-based compounds, such as ammonia. For example, the gas stream may be a waste or exhaust gas stream from an industrial process, such as a rendering process or an animal manure drying process. In some embodiments, the gas stream may be a heated gas stream or a gas stream produced by a piece of equipment that imparts heat to the gas stream, such as a dryer or evaporator in a rendering process or a manure or animal waste dryer, thereby providing a gas stream with a given heat content. It should be appreciated that the heat may be applied to whatever material is being processed by a given piece of equipment, in which case, the heated material will accordingly produce a gas stream with additional heat content. Alternatively, it should be appreciated that the gas stream may also be heated directly. As described further below, it should be appreciated that the chemical compound to be removed or recovered may be in gaseous, liquid, or solid form in the gas stream 302. It should also be appreciated that the gas stream may comprise various other chemical compounds, including compounds that may be in gaseous, liquid, or solid form that originated in the related industrial process, such as any industrial process exhaust gas stream. For example, a waste gas stream generated by a dryer in a rendering process may contain fats, oils, and greases.

In one embodiment, for example, the gas stream 302 may be a vapor discharge stream produced from a cooker, hydrolyzer, dryer, evaporator, concentrator in a rendering process. For example, infall placed in the cooker is heated, resulting in the production of a vapor discharge stream, an oil-based discharge stream, and a solids discharge stream. Similarly vapor discharge streams may be generated by various other pieces of equipment. In a rendering process, these vapor discharge streams contain a significant amount of gas phase nitrogen compounds, including ammonia, derived from the infall. Accordingly, any one or more of these vapor discharge or exhaust gas streams may be used alone or in combination as the inlet gas stream 302 in the process 300 to recover the gas phase nitrogen compounds, including ammonia, to produce a saleable product, such as a fertilizer. However, as described below, there are numerous other aspects and benefits to the process 300 of the present invention.

The chemical compound to be removed or recovered, which may be referred to as the targeted chemical compound, is any chemical, the removal of which provides a gas stream that can be further processed more easily due to the reduced amount of the targeted chemical compound, that provides value in that it can be subsequently processed resulting in operational efficiencies or cost savings, or that produces byproduct streams that have additional value. For example, the removal of a particular targeted chemical compound may provide a gas stream with a lower concentration of the targeted gas phase chemical compound that may be more easily processed as a result or that may be more easily discharged due to a lower concentration of the targeted chemical compound. In other words, the removal of the targeted compound reduces the amount of further processing or improves the efficiency or operation of such further processing. For example, the gas stream may contain compounds that must be removed prior to discharge to comply with certain emission regulations.

The targeted chemical compound may also be a compound having commercial value. In such embodiments, the process 300 can be used to recover the targeted chemical compound to produce a saleable product comprising the targeted chemical compound or a derivative of the targeted chemical compound. In some embodiments, the process 100 can be used to recover the targeted chemical compound to produce a liquid stream comprising an absorbed form of the targeted compound that can be used directly, or after further processing, as a product, such as a commercial or saleable product. It should be appreciated that in some embodiments the targeted chemical compound may be captured from the gas stream and provided in solution as a product or isolated and provided in that isolated form as a product.

In some embodiments, the targeted chemical compound is gas phase ammonia, the recovery of which as a solution can be used as a fertilizer or soil amendment in an organic farming process that produces certified organic food products. One requirement for agricultural operations that produce "organic" agricultural products is that such products must be produced without the use of synthetic chemicals. Accordingly, "organic" agricultural products must be produced using natural or non-synthetic substances. In fact, any natural or non-synthetic substance or chemical can be used in organic farming unless specifically prohibited by the USDA. The USDA maintains a list of allowed and prohibited natural substances, which is known as the "National List of Allowed and Prohibited Substances" ("National List"). The National List is well-known in the organic farming industry and is readily available from the USDA. As an example, some natural substances that are prohibited from being used in organic farming include arsenic and strychnine. It should be appreciated that various states, agencies, and other organizations maintain lists of approved materials, such as the California Department of Food and Agriculture, Washington State University, and the Organic Materials Review Institute.

One substance or chemical that an organic farming operation may use is a soil amendment or fertilizer. Accordingly, to be compliant with the National Organics Program (NOP) statutes, rules, and regulations, such a fertilizer must be a natural or non-synthetic substance. The NOP at 7 U.S.C. § 6502(21) defines "synthetic" as "a substance that is formulated or manufactured by a chemical process or by a process that chemically changes a substance extracted from naturally occurring plant, animal, or mineral sources, except that such term shall not apply to substances created by naturally occurring biological processes."

Moreover, the USDA provides a well-known procedure for determining whether a substance is synthetic or non-synthetic. This procedure is found in the National Organic Program Handbook provided by USDA ("Handbook"). The Handbook provides guidance, instructions, and policy memos to assist with compliance with NOP rules and regulations. The procedure for determining whether a substance is synthetic or non-synthetic is entitled "Guidance: Decision Tree for Classification of Materials as Synthetic or Nonsynthetic," which is found in the Handbook at Section A Standards, NOP 5033-1. Provided the ammonia in the gas stream 302 is not synthetic, its recovery using the process 100 shown in FIG. 1, may provide a liquid stream containing the ammonium, which can be used as a fertilizer or soil amendment in an organic farming process.

As described, the targeted chemical compound may be any chemical compound desired to be removed or recovered. However, for simplicity, the following description of the process 100 will be described in some instances with reference to ammonia as the targeted chemical compound to be removed and recovered from the gas stream 302.

The gas stream 302 containing ammonia is fed to a gas/liquid contactor 304. The gas/liquid contactor 304 may be any gas/liquid contactor known in the art, such as, but not limited to, a spray tower, a tray absorber, or a bubbler. The gas/liquid contactor 304 may be operated in a counter-current fashion, co-current fashion, or cross-current fashion or in any other manner that provides sufficient contact between a gas and a liquid. It should be appreciated that more than one gas/liquid contactor 304 may be used in series or in parallel.

The gas/liquid contactor 304 is operated by passing a liquid scrubbing solution 306 through the gas/liquid contactor 304 such that the gas stream 302 is contacted by the liquid scrubbing solution 306. The liquid scrubbing solution 306 may be recycled through the gas/liquid contactor 304 by passing the liquid scrubbing solution 306 from a holding tank 308 through a feed line or recycle line 310 to the gas/liquid contactor 304, through a discharge line 312 and back to the holding tank 308. It should be appreciated that the holding tank 308 may be a separate tank or may be integrated into the gas/liquid contactor 304 forming a sump at the bottom of the gas/liquid contactor 304 such that the liquid scrubbing solution 306 would fall directly through the gas/liquid contactor 304 and into the sump holding a reservoir of the liquid scrubbing solution 306.

The targeted chemical compound is absorbed or scrubbed by the liquid scrubbing solution 306 in the gas/liquid contactor 304, thereby removing at least a portion or all of the targeted chemical compound from the gas stream 302 and transferring the targeted chemical compound into the liquid scrubbing solution 306. Accordingly, the composition of the liquid scrubbing solution 306 may be adapted to enhance absorption or removal of the targeted chemical compound from the gas stream 302. In such cases, chemicals may be added to the liquid scrubbing solution 306, for example, to replenish any chemicals depleted as a result of absorption or reaction of the targeted chemical compound. After absorbing the targeted gas phase chemical compound from the gas stream 302, the gas stream 302 exits the gas/liquid contactor 304 as an exit gas stream 316 with a lower concentration of the targeted gas phase chemical compound.

In some embodiments, pH control may be used for absorption of certain acidic or basic targeted chemical compounds. During absorption, the targeted chemical compound passes from the gas stream 302 into the liquid scrubbing solution 306, resulting in a pH change in the liquid scrubbing solution 306. Therefore, the pH of the liquid scrubbing solution 306 may be controlled to minimize such a change. The pH may be selected based upon the specific targeted chemical compound being removed and may be controlled at that pH during operation using the addition of acid 314 or base 315 as necessary to the holding tank 308 or the recycle line 310 using either feedback or feedforward control. It should be appreciated that any acid may be used that is compatible with the overall system chemistry, including the desired end use of the liquid stream comprising the absorbed form of the targeted compound in those cases in which the liquid stream is a desired product. In some embodiments, such control can be done through the addition of the acid or carbon dioxide addition as described above similarly in a feedback or feedforward control manner.

Once absorbed, the targeted chemical compound is converted into an absorbed form, which is the chemical composition into which the targeted chemical compound is converted, for example through reaction, upon absorption into the scrubbing solution 306. The specific chemical composition of the absorbed form depends upon the specific composition and phase of the targeted chemical compound and the composition of the scrubbing solution 306. Accordingly, in some embodiments, the absorbed form may simply be the hydrated form of the targeted chemical compound. In one embodiment, that targeted chemical compound is ammonia, and the liquid scrubbing solution 306 may be any solution capable of absorbing ammonia, such as an acidic-based solution. The absorbed form of the ammonia may be ammonium hydroxide or ammonium cation.

As described above, the scrubbing solution 306 can be recycled through the gas/liquid contactor 304. In this case, the liquid scrubbing solution 306 is fed to the gas/liquid contactor 304 in which it contacts the gas stream 302 resulting in absorption of the targeted chemical compound into the scrubbing solution 306. The scrubbing solution 306 then exits the gas/liquid contactor 304 as a scrubbing solution with the absorbed form of the targeted chemical compound 308. Accordingly, the liquid scrubbing solution 306 with the absorbed form of the targeted gas phase chemical compound 308 from the gas/liquid contactor 304 is basically collected in the holding tank 308. Alternatively, it should be appreciated that the liquid scrubbing solution 306 may be used as a single-pass or in a once-through fashion such that the liquid scrubbing solution only passes through the gas/liquid contactor 304 one time.

A portion of the liquid scrubbing solution 306 held in the holding tank 308 is discharged as a liquid stream or product stream 318. This product stream 318 is a liquid solution containing the absorbed form of the targeted chemical compound. The product stream 318 can be used directly, or after further processing, as a product, such as a commercial or saleable product, which may include its use in another process. Such further processing may include, for example, processing the product stream 318 to isolate the absorbed form of the targeted chemical compound for further use, such as drying the product stream 318 to provide a dried form of the absorbed targeted compound. In some embodiments, a crystallizer or evaporator or other means known in the art may be used to further concentrate the absorbed form of the targeted chemical compound in the product stream 318. In one embodiment, the targeted chemical compound is ammonia such that the product stream 318 may be a liquid stream comprising ammonium hydroxide or ammonium cation that can be used directly as a fertilizer. Alternatively, or in addition, the product stream 318 can be further processed, for example, by removing water to concentrate the ammonium and provide a dried form of the ammonium for use as a fertilizer. It should be appreciated that in some embodiments, described further below, the dried form of the ammonium may be ammonium hydroxide, ammonium acetate, ammonium citrate, or other dried form of the targeted compound. It should be appreciated that in some embodiments, it may be desirable to rehydrate the dried form of the targeted compound at the point of use, which can be easily done by any means known in the art.

In another alternative embodiment in which the targeted chemical compound is ammonia, and in which the process is implemented in the same manner as shown in FIG. 1, the liquid scrubbing solution 306 can be operated at an acidic pH by adding an acid, such as any inorganic acid or organic acid, such as citric acid, to the scrubbing solution 306. The use of an acid acts to increase the solubility, and therefore the removal, of the ammonia from the gas stream 302. Accordingly, this embodiment enables treatment of a gas stream having a relatively higher concentration of ammonia. It should be appreciated that the acid 314 may be added to the liquid scrubbing solution 306 in the holding tank 308 or it can be added to the liquid scrubbing solution 306 in the recycle line 310 or both. Alternatively or in addition, the acidic solution can be sprayed into the gas stream 302 upstream of the gas/liquid contactor 304. In some alternative embodiments, carbon dioxide can be injected into the liquid scrubbing solution 306 to reduce or control the pH. Similarly, the carbon dioxide can be added to the gas stream 302 upstream of the gas/liquid contactor 304 or sparged or bubbled into the holding tank 308.

It should be appreciated that the acid can be used to react with absorbed ammonia to produce a corresponding dissociated ammonium in solution constituting a product for use as a fertilizer. For example, citric acid can be added to produce dissociated ammonium citrate in solution. Alternatively, in one embodiment, the acid can be added to the liquid product stream 318, as opposed to the circulating liquid scrubbing solution 306, to form the corresponding dissociated ammonium in solution. It should also be appreciated that if the acid is an organic acid that is approved for use in producing a fertilizer or soil amendment, such as a non-synthetic or natural organic acid, the liquid product stream 318 can be used in organic farming to produce certified organic products. It should be appreciated that any organic acid may be used, including organic acids similar to citric acid, such as acetic acid, lactic acid, humic acid, or gluconic acid or other fermented acids. It should also be appreciated that other acids, including synthetic or non-synthetic acids may be used, such as sulfuric, nitric, phosphoric, and hydrochloric acids.

As described above, the pH of the liquid scrubbing solution 306 can be adjusted using these particular acids as well to provide for absorption of the targeted gas phase chemical compound. Further, the pH of the scrubbing solution 306 can be controlled at a given pH setpoint for such purposes. Such control can be done through the addition of the acid or carbon dioxide addition as described above. Similarly, such pH control can be performed using either feedback or feedforward control.

It should be appreciated that in the embodiment with ammonia as the targeted chemical compounds, the removal of a relatively larger percentage of the ammonia from the initial gas stream 302 in the gas/liquid contactor 304 has the effect of reducing the biological oxygen demand (BOD) in the liquid streams produced by the process 300 downstream of the gas/liquid contactor 304. This occurs because the removal of ammonia at this point in the process 300 means that less ammonia will be absorbed or condensed into liquid streams downstream, and any associated liquid streams that are discharged, for example, to a wastewater treatment system will have a lower BOD.

Returning to the exit gas stream 316 from the gas/liquid contactor, this exit gas stream 316 can be optionally passed through an evaporator 320 to evaporate and remove a given portion of water from another, separate process stream by utilizing the heat content of the exit gas stream 316, after which this separate process stream may be further processed, for example, by condensing, scrubbing, or combusting in a thermal oxidizer, regenerative thermal oxidizer, boiler, or other combustion device. By transferring heat from the exit gas stream 316 to a separate process stream using the evaporator 320, a portion of the water vapor in the exit gas stream 316 may be condensed due to the corresponding temperature reduction. By removing a portion of the water vapor from the exit gas stream 316, the volume of the gas stream 316 will be reduced, which makes further processing of this gas stream easier.

After passing the exit gas stream 316 through the optional evaporator 320, the exit gas stream is passed to condenser 322. The condenser 322 is used to condense certain components, including water, in the exit gas stream 316 to produce a condensate stream 324 and a vapor stream 326. In some embodiments, the condenser 322 is used to condense certain compounds from the gas stream 302, for example, to meet any regulatory discharge requirements, followed by treatment of the resulting liquid stream prior to discharge, such as treatment in a wastewater treatment facility. In this case, the process of the present invention acts as a pretreatment step for any wastewater treatment system by removing a targeted chemical compound from the gas stream that may reduce the burden on the subsequent wastewater treatment system. It should be appreciated, however, that the upstream removal of ammonia in the gas/liquid contactor 304 and subsequent condensation of the exit gas stream 316 in the condenser 322 to condense other compounds that must be removed into a liquid stream that is treated by a wastewater treatment system, results in lower ammonium concentration in that liquid stream, thereby reducing the burden or load of ammonium on any wastewater treatment system.

It should be appreciated that additional gas streams 328A-328F, having the same or other targeted chemical compounds, can be added to the vapor stream 326 exiting the condenser 322. For example, gas streams or vapor streams from various process operations or equipment may be added to the vapor stream 326 exiting the condenser 322. In some embodiments, such as rendering, the various gas streams 328A-328F may include a gas stream 328A produced by a fat drainer that may also produce an oil/solids stream, a gas stream 328B produced by a drainer that may also produce an oil/solids stream, a gas stream 328C produced by a wet crax (which is the cooked meat leaving the cooker) that may also produce a solids stream, a gas stream 328D produced by a centrifuge that may also produce an oil/solids stream, a gas stream 328E, or more than one gas stream, produced by one or more presses that may also produce a solids stream, an oil stream, and a gas stream 328F that may be a process vapor stream or multiple combined process vapor streams produced elsewhere in the rendering process, such as a feather hydrolyzer, that may also produce corresponding oil/solids stream(s).

It should be appreciated that in some embodiments, such as rendering, in which the targeted chemical compound is ammonia, each of these streams 328A-328F contain ammonia. Therefore, the addition of these streams 328A-328F will add ammonia to the vapor stream 326 exiting the condenser 322. It should be appreciated, however, that one or more of these gas streams 328A-328F, alone or in combination, may serve similarly as the primary gas stream 302 in the process 300. It should also be appreciated that effectively removing ammonia from these additional gas streams 328A-328F will also reduce the BOD compared to systems in which this ammonia is not removed.

The gas stream 326 exiting the condenser 322, combined with one or more other gas streams 328A-328F, forms a combined gas or vapor stream 330 that is passed to a spray venturi 332. The spray venturi 332 is used to separate or reduce any solid matter or aerosols from the combined gas stream 330, such as particulate matter. The solid matter 334 separated in the spray venturi 332 is discharged, and the gas stream 336 exiting the spray venturi 332 is passed to an alkaline scrubber 338. It should be appreciated that any gas/solid separator may be used in place of the spray venturi 332.

The alkaline scrubber 338 is used to scrub the gas stream 336 from the spray venturi 332 using an alkaline scrubbing solution. Generally, the alkaline scrubber 338 can be used to remove or reduce the concentration of any acidic species in the combined gas stream 336, such as sulfur-based compounds, including hydrogen sulfide and sulfur dioxide. It should be appreciated that the alkaline scrubber 338 can be any gas/liquid contactor and can be operated in the same fashion as the gas/liquid contactor used to remove the targeted chemical compound from the initial gas stream 302. The absorbed species can be removed from the alkaline scrubbing solution through a blowdown stream 340 or by other means known in the art. It should be appreciated that in some embodiments in which sulfur-based compounds are absorbed in the alkaline scrubber 338, that sulfur can ultimately be recovered for subsequent use. It should be appreciated that mercaptans may also be removed using the alkaline scrubber 338. In some embodiments, the pH of the alkaline scrubbing solution in the alkaline scrubber 338 is controlled at a pH greater than 7.0. In some embodiments, the pH of this scrubbing solution is controlled at a pH of approximately 7.5, 8.0, 8.5, 9.0, 9.2, or 9.5 or higher. In some embodiments, it should be appreciated that the alkaline scrubber 338 may be controlled at a neutral pH of 7.0.

The gas stream 342 exiting the alkaline scrubber 338 is then passed to an acid scrubber 344 to scrub the gas stream 342 using an acidic-based scrubbing solution. The acid scrubber 342 is used to scrub the gas stream 342 from the alkaline scrubber 338 to additionally remove any chemical compounds that can be absorbed using an acidic scrubber solution, such as amines, aldehydes, and organic acids, noting that in some embodiments, the acid scrubber 344 may instead be a distillation column. It should be appreciated that the acid scrubber 344 can be any gas/liquid contactor and can be operated in the same fashion as the gas/liquid contactor used to remove the targeted chemical compound from the initial gas stream 302. In some embodiments in which the targeted chemical compound is ammonia, additional ammonia, including ammonia that remained in the gas stream 316 exiting the gas/liquid contactor 304 and ammonia added through the addition of other gas streams, such as the additional gas streams 328A-328F, can be removed in the acid scrubber 344. Accordingly, in some embodiments, a portion, and in some embodiments a majority or all, of the ammonia, for example, will have been removed from the various gas streams. The acid scrubber 344 then produces an exit gas stream 346 that has passed through the acid scrubber 344. The absorbed species can be removed from the acid-based scrubbing solution through a blowdown stream 347 or by other means known in the art. It should be appreciated that the blowdown stream 347 from the acid scrubber 344 may be separately discharged or it may be added to the holding tank 308 as make-up water or to the recycle line 310 at a metered rate. Alternatively, the blowdown stream 347 may be added with the infall to any of the heater processes within the overall rendering process, in which case, the added heat will volatilize the targeted chemical compound, which will then be conveyed to the gas/liquid contactor 304 for absorption.

The gas stream 346 exiting the acid scrubber 344 is then sent to an oxidizer or combustion device 348. The combustion device 348 may any type of combustion device, such as a boiler, or thermal oxidizer used to treat a gas stream, such as a thermal oxidizer or a regenerative thermal oxidizer. The oxidizer 348 is used to reduce the concentration of various components of the gas stream 346 exiting the acid scrubber 344 prior to discharge of the resulting exit gas stream 350 to the atmosphere. It should be appreciated that the oxidizer may be used to reduce specific compounds to meet regulatory emission limits.

It should be appreciated that the overall process 300 provides for the successive removal of various components by the various, sequential process operations, including, for example, the targeted chemical compound, in addition to the removal of other chemical compounds founds in the initial gas stream 302 or those gas streams added to the process 328A-328F. Accordingly, in some embodiments, this effect ultimately reduces the burden on the oxidizer 348. For example, using ammonia as the targeted chemical compound in the initial gas stream 302, the removal of ammonia through at least the scrubbing process in the first gas/liquid contactor 304 and the acid scrubber 344 results in the removal of a significant portion, if not all, of the ammonia. Therefore, the gas stream 346 exiting the acid scrubber 344 will provide a relatively lower load of ammonia to the oxidizer 348. Since ammonia is a precursor to formation of $NO_x$ compounds in the oxidizer 348, the reduction in ammonia will provide a much lower formation rate and amount of $NO_x$ compounds in the oxidizer 348 and the gas discharge from the oxidizer. Similarly, the alkaline scrubber 338 will reduce the $SO_x$ loading to the oxidizer 348, thereby reducing the $SO_x$ emissions from the oxidizer 348. Further, it should be appreciated that particulate matter (PM), including PM 2.5, may also be reduced in the exit gas stream 350 from the oxidizer 348. Since PM is formed post combustion from the combination of ammonia and hydrogen sulfide to form ammonia sulfate, the reduction of these reactants by the various process operations in the overall process 300, will result in lower formation of PM. Reducing the concentration of ammonia as described above and reducing the concentration of hydrogen sulfide, for example, through the use of the alkaline scrubber 332, will reduce the formation of PM and the amount of PM discharged.

It should be appreciated that the gas stream 346 exiting the acid scrubber 344 can optionally be discharged to the atmosphere simply as a discharge gas stream 352. In this case, the overall process 300 would have removed sufficient quantities of any chemical compounds from the initial gas stream 302 or those gas streams added to the process 328A-328F culminating in the gas stream 330, to satisfy any regulatory emission requirements. Alternatively, the gas stream 346 exiting the acid scrubber 344 can optionally be sent to a boiler 354 in which the gas stream would be incinerated to destroy any remaining chemical compounds in the gas stream 348 to produce a discharge gas stream 356 from the boiler 354 having acceptable criteria for discharge.

As noted, the overall process 300 provides for the removal of not only the targeted chemical compound from the initial gas stream 302 and those gas streams added to the process 328A-328F, but other chemical compounds as well. For example, various process equipment in a rendering process may produce solid organic and inorganic particulates, smoke particulates, aerosolized oils greases, tallows, waxes and water vapor having odorous, noxious, hazardous, toxic, mutagenic, and/or carcinogenic compounds and/or precursor compounds such as hydrogen sulfide, ammonia, carboxylic acids, esters, alcohols, ketones, aldehydes, amines, mercaptans, alkenes, furans, pyrazines, pyrroles, thiazoles, pyridine and other VOCs and SVOCs, all of which may be present in the initial gas stream 302. The overall process 100 may provide for the removal of one or more of these compounds, regardless of whether such is the targeted compound for removal. For example, the process 100 provides for the removal of various aerosols, oils, and other compounds that may be present in the initial gas stream 302. A reduction in these compounds effectively also reduces BOD, similar to the reduction provided by the removal of ammonia in the gas/liquid contactor 304 as described above. Accordingly, various condensates and blowdown streams produced in the process 300 will have a relatively lower BOD compared to systems without the removal of these compounds. Additionally, the removal of hydrogen sulfide not only reduces PM formation and discharge, but its removal also reduces odor in related condensate or blowdown streams. For example, in condensate streams produced downstream of the gas/liquid contactor 304 in which ammonia is removed, such as the condensate stream 324 from the condenser 322, the lack of ammonia in the condensed stream, which increases the pH of the condensed stream and the absorption or co-condensation of hydrogen sulfide, less hydrogen sulfide will co-condense. This also reduces the amount of off-gassing of hydrogen sulfide from such condensate streams and provides an additional safety benefit by reducing the accumulation of hydrogen sulfide in areas of a facility where off-gassing of hydrogen sulfide results in an accumulation of hydrogen sulfide in such areas. Further, reductions in the BOD in the condensate produced by the condenser 322 and in the blowdown streams 340, 347 from the alkaline scrubber 338 and the acid scrubber 344, respectively, can provide a subsequent reduction in the production of bio-gas generated, particularly methane, in any biological system employed as a pretreatment step at many facilities prior to discharge of any liquid.

Figure 4:
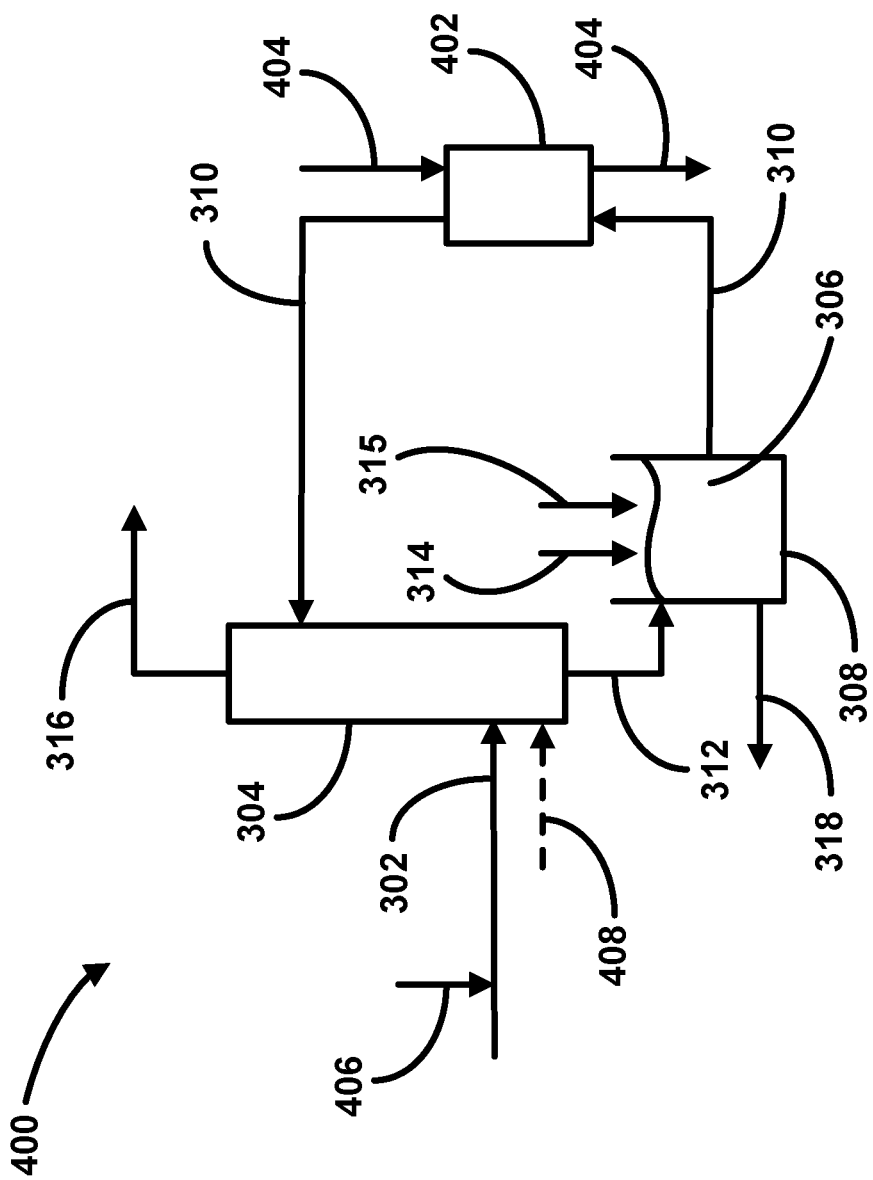
FIG. 4 illustrates a process flow diagram of a portion of the process shown in FIG. 1 with additional processing features according to one embodiment of the present invention.

FIG. 4 illustrates a process flow diagram of a portion of the process shown in FIG. 1 with additional processing features according to one embodiment of the present invention. FIG. 4 illustrates a portion 400 of the process 300 of FIG. 3, specifically, the gas/liquid contactor 304 and associated holding tank 308. The operation of the gas/liquid contactor 304 and holding tank 308 is as described above in connection with FIG. 3. However, two additional processing options are shown in FIG. 4. It should be appreciated that both processing options shown in FIG. 4, as described below, may be used separately or alone or in combination.

In one embodiment, one additional processing option includes the use of a heat exchanger 402. As shown, the heat exchanger 402 is used to add heat from another process stream 404, which can be any available process stream that can be cooled and can provide sufficient heat to the heat exchanger 402 as required, to the recycle line 310 and the scrubbing solution 306 carried by the recycle line 310 from the holding tank 308 to the gas/liquid contactor 304. It should be appreciated that any heat exchanger may be used.

In many of the gas streams that may be fed to the gas/liquid contactor 304 for removal of a targeted chemical compound, the water content of the gas stream may be relatively high. For example, in rendering processes, the gas streams that originate from equipment such as the cooker, hydrolyzer, dryer, evaporator, or concentrator have been generated through the addition of heat to the material being processed to drive-off moisture in that material, which results in the production of a gas stream having a relatively high water content. Feeding such high water content gas streams to the gas/liquid contactor 304 may result in condensation of that water vapor from the gas into the scrubbing solution 306. As a result, the addition of this water from the gas stream 302 will ultimately dilute the recovered absorbed form of the targeted chemical compound, for example, in the product stream 318.

Accordingly, in operation, the heat exchanger 402 is used to convey heat to the scrubbing solution 306 as it passes through the recycle line 310 from the holding tank 308 to the gas/liquid contactor 304. By heating the recirculating scrubbing solution 306, the temperature of the scrubbing solution 306 relative to the temperature of the gas/liquid contactor 304 can be controlled to a point where the water vapor in the gas stream 302 fed to the gas/liquid contactor 304 either does not condense or the amount of condensation is reduced compared to not heating the scrubbing solution 306. It should be appreciated that the heat applied to the scrubbing solution 306 using the heat exchanger may be increased to the point where water from the scrubbing solution 306 may actually evaporate or flash into the gas stream 302 being fed to the gas/liquid contactor. Therefore, it should be appreciated that control of the temperature of the recirculating scrubbing solution 306 can be used to control the concentration of the absorbed form of the targeted chemical compound in the product stream 318. This is accomplished by controlling the heat exchanger 402 to reduce, minimize, or avoid condensation of water vapor in the gas stream 302 being fed to the gas/liquid contactor 304. The heat exchanger 402 may be controlled using a feedback control system based upon the temperature of the recirculating scrubbing solution 306 may be used, with the setpoint determined based upon the amount of water vapor in the gas stream 302 being fed to the gas/liquid contactor 304 and the desired reduction in condensation of the water vapor in the gas stream 302. Accordingly, by controlling the concentration of the absorbed form of the targeted chemical compound in the product stream, such avoids the need for further processing of the product stream to increase the concentration of the absorbed form of the targeted chemical compound to an acceptable level, such as by evaporating water from the product stream.

It should be appreciated that in some embodiments, rather than using a heat exchanger, other methods of heating the scrubbing solution 306 may be used. For example, direct heating of the recycle line 310 using a fuel-fired heater may be used. Alternatively, direct heating of the holding tank 308, using a fuel-fired heater may also be used. It should be appreciated that depending upon the desired temperature of the scrubbing solution 306, combined methods of heating may be used.

In another embodiment, a second processing option includes the addition of air to the gas stream 302 being fed to the gas/liquid contactor. As shown, air 406 is added to the gas stream 302 being fed to the gas/liquid contactor 304 at a point upstream of the gas/liquid contactor 304. Alternatively, air 408 may be added directly to the gas/liquid contactor 304. The addition of the air is used to allow for evaporation or flashing of water from the scrubbing solution 306, particularly in those cases in which the gas stream 302 being fed to the gas/liquid contactor 304 is saturated and unable to carry any additional water vapor that could evaporate from the scrubbing solution 306. As described above, evaporation or flashing of water from the scrubbing solution 306 into the gas stream 302 in the gas/liquid contactor 304 allows the absorbed form of the targeted chemical compound in the product stream 318 to be concentrated. The amount of air 406, 408 added can be controlled based upon the moisture content of the gas stream 302 being fed to the gas/liquid contactor 304 and the desired concentration of the absorbed form of the targeted chemical compound in the product stream 318, as well as any existing moisture or water vapor content of the air 406, 408.

Various embodiments of the invention have been described above. However, it should be appreciated that alternative embodiments are possible and that the invention is not limited to the specific embodiments described above. For example, the gas stream comprising the targeted gas phase chemical compound may be any gas stream. For example, the gas stream could be any waste or process gas stream, such as a gas stream from a dryer used in a drying process. Further, the gas stream may be a gas stream generated by any process including any industrial process. In some embodiments, the gas stream is generated by a rendering process or manure, animal, or human waste drying process. Further, in those embodiments in which the targeted gas phase chemical compound is ammonia, any gas stream comprising ammonia can be used, including any gas stream comprising ammonia and water vapor. It should also be appreciated that more than one targeted compound may be removed using the process of the present invention.

What is claimed is:

1. A method for removing a chemical compound from a waste gas stream to prepare the waste gas stream for further processing, comprising:
   feeding a waste gas stream to a gas/liquid contactor, wherein the waste gas stream comprises a targeted chemical compound to be removed from the waste gas stream; and
   absorbing the targeted chemical compound from the waste gas stream into a scrubbing solution in the gas/liquid contactor, thereby producing an exit gas stream from the gas/liquid contactor;
   wherein said absorbing is performed prior to any condensing of the waste gas stream.

2. The method of claim 1, further comprising:
   condensing the exit gas stream from the gas/liquid contactor to produce a condensed gas stream for further processing.

3. The method of claim 2, further comprising:
   after said condensing, optionally combining a second waste gas stream comprising the targeted chemical compound with the condensed gas stream;
   removing a portion of solid matter from the condensed gas stream;
   after said removing, scrubbing the condensed gas stream with an alkaline scrubbing solution to remove a portion of an acidic gaseous compound from the condensed gas stream;
   after said scrubbing the condensed gas stream with the alkaline scrubbing solution, scrubbing the condensed gas stream with an acidic scrubbing solution to remove a portion of any of the targeted chemical compound in the condensed gas stream; and
   after said scrubbing the condensed gas stream with an acidic scrubbing solution, discharging the condensed gas stream.

4. The method of claim 2, wherein said condensing the exit gas stream produces a condensate stream and wherein said absorbing the targeted chemical compound from the waste gas stream in the gas/liquid contactor provides a corresponding reduced concentration of the targeted chemical compound in the condensate stream and further comprising:
   treating the condensate stream to remove the targeted chemical compound in the condensate stream.

5. The method of claim 4, wherein said treating the condensate stream provides a condensate stream having a lower biological oxygen demand compared to the condensate stream prior to said treating and is performed upstream of a wastewater treatment facility.

6. The method of claim 1, wherein said waste gas stream is produced in an animal byproduct process.

7. The method of claim 1, wherein said waste gas stream is produced in an animal waste process.

8. The method of claim 7, wherein said animal waste process comprises a rendering process.

9. The method of claim 8, wherein said waste gas stream is produced by a piece of equipment consisting of a cooker, dryer, evaporator, concentrator, or a combination thereof.

10. The method of claim 1, wherein the targeted chemical compound comprises ammonia.

11. The method of claim 1, wherein said absorbing the targeted chemical compound from the waste gas stream into the scrubbing solution produces an absorbed form of the targeted chemical compound in the scrubbing solution, and further comprising:
   removing a portion of the scrubbing solution comprising the absorbed form of the targeted chemical compound as a product stream.

12. The method of claim 11, wherein the targeted chemical compound comprises a nitrogen-based compound, the scrubbing solution comprises an acid, and said absorbing the targeted chemical compound from the waste gas stream into the scrubbing solution produces an absorbed form of the targeted chemical compound in the scrubbing solution comprising a conjugate base form of the nitrogen-based compound corresponding to the acid.

13. The method of claim 12, wherein the nitrogen-based compound is ammonia and the product stream comprises a fertilizer.

14. The method of claim 13, wherein the acid comprises a non-synthetic acid and the product stream comprises a fertilizer suitable for organic agriculture.

15. A method for removing a chemical compound from a waste gas stream to prepare the waste gas stream for further processing, comprising:
   feeding a waste gas stream to a gas/liquid contactor, wherein the waste gas stream comprises a targeted chemical compound to be removed from the waste gas stream;
   recycling a scrubbing solution through the gas/liquid contactor;
   heating the scrubbing solution during said recycling to provide heat to the scrubbing solution to reduce condensation of water content of the waste gas stream compared to not heating the scrubbing solution; and
   absorbing the targeted chemical compound from the waste gas stream into the scrubbing solution in the gas/liquid contactor, thereby producing an exit gas stream from the gas/liquid contactor;
   wherein said absorbing is performed prior to any condensing of the waste gas stream.

16. The method of claim 15, further comprising:
   condensing the exit gas stream from the gas/liquid contactor to produce a condensed gas stream for further processing.

17. The method of claim 16, further comprising:
   after said condensing, optionally combining a second waste gas stream comprising the targeted chemical compound with the condensed gas stream;
   removing a portion of solid matter from the condensed gas stream;
   after said removing, scrubbing the condensed gas stream with an alkaline scrubbing solution to remove a portion of an acidic gaseous compound from the condensed gas stream;
   after said scrubbing the condensed gas stream with the alkaline scrubbing solution, scrubbing the condensed gas stream with an acidic scrubbing solution to remove a portion of any of the targeted chemical compound in the condensed gas stream; and
   after said scrubbing the condensed gas stream with an acidic scrubbing solution, discharging the condensed gas stream.

18. A method for removing a chemical compound from a waste gas stream from a process to produce a product stream, comprising:
   adding air to a waste gas stream to produce a diluted waste gas stream, wherein the waste gas stream comprises a targeted chemical compound to be removed from the waste gas stream;
   feeding the diluted waste gas stream to a gas/liquid contactor; and
   absorbing the targeted chemical compound from the waste gas stream into a scrubbing solution in the gas/liquid contactor, thereby producing an exit gas stream from the gas/liquid contactor;
   wherein said absorbing is performed prior to any condensing of the waste gas stream.

19. The method of claim 18, further comprising:
   condensing the exit gas stream from the gas/liquid contactor to produce a condensed gas stream for further processing.

20. The method of claim 19, further comprising:
   after said condensing, optionally combining a second waste gas stream comprising the targeted chemical compound with the condensed gas stream;
   removing a portion of solid matter from the condensed gas stream;
   after said removing, scrubbing the condensed gas stream with an alkaline scrubbing solution to remove a portion of an acidic gaseous compound from the condensed gas stream;
   after said scrubbing the condensed gas stream with the alkaline scrubbing solution, scrubbing the condensed gas stream with an acidic scrubbing solution to remove a portion of any of the targeted chemical compound in the condensed gas stream; and
   after said scrubbing the condensed gas stream with an acidic scrubbing solution, discharging the condensed gas stream.

* * * * *